(12) United States Patent
Jiang

(10) Patent No.: US 11,843,518 B2
(45) Date of Patent: Dec. 12, 2023

(54) NETWORK SERVICE PROCESSING METHOD, SYSTEM, AND GATEWAY DEVICE

(71) Applicant: HUAWEI TECHNOLOGIES CO., LTD., Guangdong (CN)

(72) Inventor: Wu Jiang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/742,341

(22) Filed: May 11, 2022

(65) Prior Publication Data
US 2022/0272003 A1  Aug. 25, 2022

Related U.S. Application Data

(63) Continuation of application No. PCT/CN2020/121251, filed on Oct. 15, 2020.

(30) Foreign Application Priority Data

Nov. 11, 2019 (CN) .......................... 201911097192.1
Nov. 19, 2019 (CN) .......................... 201911134443.9

(51) Int. Cl.
| | |
|---|---|
| *H04L 41/00* | (2022.01) |
| *H04L 12/66* | (2006.01) |
| *H04L 41/0894* | (2022.01) |
| *H04L 41/5006* | (2022.01) |
| *H04L 41/5009* | (2022.01) |

(52) U.S. Cl.
CPC .............. *H04L 41/20* (2013.01); *H04L 12/66* (2013.01); *H04L 41/0894* (2022.05); *H04L 41/5006* (2013.01); *H04L 41/5009* (2013.01)

(58) Field of Classification Search
None
See application file for complete search history.

(56) References Cited

U.S. PATENT DOCUMENTS

| | | | |
|---|---|---|---|
| 2001/0002914 A1 | 6/2001 | Aramoto | |
| 2016/0285802 A1* | 9/2016 | Brandenburg | .......... H04L 41/22 |

(Continued)

FOREIGN PATENT DOCUMENTS

| | | |
|---|---|---|
| CN | 101141360 A | 3/2008 |
| CN | 101340497 A | 1/2009 |

(Continued)

*Primary Examiner* — Angela Nguyen
(74) *Attorney, Agent, or Firm* — Gregg L. Jansen

(57) ABSTRACT

This application discloses a network service processing method, a network service processing system, and a gateway device, to alleviate a problem that the gateway device cannot meet increasing additional function requirements. The gateway device identifies a type of a first intranet device, where the first intranet device belongs to an intranet connected to the gateway device. The gateway device obtains a first software package based on the type of the first intranet device, where the first software package is used to implement a first additional function. The gateway device sends a first indication message and the first software package to the first intranet device, where the first indication message is used to indicate the first intranet device to install the first software package and execute the first additional function.

20 Claims, 10 Drawing Sheets

(56) References Cited

U.S. PATENT DOCUMENTS

| | | | |
|---|---|---|---|
| 2019/0090158 A1 | 3/2019 | Das et al. | |
| 2019/0342179 A1 | 11/2019 | Barnard et al. | |
| 2021/0044579 A1* | 2/2021 | Nelson-Gal | H04L 63/166 |
| 2021/0227404 A1* | 7/2021 | Lydecker | G06F 8/658 |

FOREIGN PATENT DOCUMENTS

| | | |
|---|---|---|
| CN | 101931592 A | 12/2010 |
| CN | 102638460 A | 8/2012 |
| CN | 102938718 A | 2/2013 |
| CN | 103677899 A | 3/2014 |
| CN | 104821911 A | 8/2015 |
| CN | 105577496 A | 5/2016 |
| CN | 108377222 A | 8/2018 |
| CN | 110099074 A | 8/2019 |
| JP | 2005065281 A | 3/2005 |
| WO | 2016169218 A1 | 10/2016 |

* cited by examiner

NETWORK SERVICE PROCESSING METHOD, SYSTEM, AND GATEWAY DEVICE

CROSS-REFERENCE TO RELATED APPLICATIONS

This application is a continuation of International Application No. PCT/CN2020/121251, filed on Oct. 15, 2020, which claims priority to Chinese Patent Application No. 201911097192.1, filed on Nov. 11, 2019, and to Chinese Patent Application No. 201911134443.9, filed on Nov. 19, 2019, all of which are incorporated herein by reference in their entireties.

TECHNICAL FIELD

This application relates to the field of computer and communication technologies, and in particular, to a network service processing method, a network service processing system, and a gateway device.

BACKGROUND

A gateway device is a device configured to connect two networks, and is an important basic device for building a local area network for an enterprise and many other organizations, such as a campus or home. Various types of local area networks are connected to the internet through gateway devices. A basic function of the gateway device is to forward a packet between the two networks. In consideration of user requirements and costs, in many scenarios, the gateway device often needs to integrate a plurality of additional functions such as a firewall function, a security sandbox function, or a network buffer (also referred to as a "web disk") function.

However, the gateway device is limited by its own hardware resources and cannot support more additional functions. Integrating the plurality of additional functions often significantly degrades performance of the gateway device, and further affects normal working of an entire local area network system. How to solve this contradiction is an urgent problem that needs to be resolved.

SUMMARY

Embodiments of this application provide a network service processing method, to alleviate a problem that a gateway device cannot meet increasing additional function requirements.

According to a first aspect, a network service processing method is provided. In the method, a gateway device identifies a type of a first intranet device, where the first intranet device belongs to an intranet connected to the gateway device. The gateway device obtains a first software package based on the type of the first intranet device, where the first software package is used to implement a first additional function. The gateway device sends a first indication message and the first software package to the first intranet device, where the first indication message is used to indicate the first intranet device to install the first software package and execute the first additional function.

According to the method, the gateway device serves as a management control entity that implements the additional function; and controls, based on the type of the intranet device, the appropriate intranet device to install the software package to implement the additional function. A portion of load of performing the additional function is transferred from the gateway device to the intranet device. Therefore, processing load of the gateway device is reduced. This can reduce a processing resource and a storage resource of the gateway device, and provide a solution for implementing the additional function by the gateway device at low costs. Furthermore, the solution uses an idle resource of the intranet device to implement the additional function, thereby improving utilization of an intranet resource.

Optionally, to improve accuracy of matching between the intranet device and the software package (or the additional function), the gateway device determines, based on performance of the intranet device, the software package to be installed on the intranet device. In an implementation of the first aspect, the gateway device obtains the first software package in the following manner. The gateway device determines the performance of the first intranet device based on the type of the first intranet device, where the performance includes a software capability and a hardware capability, the software capability includes whether software package installation is supported, and the hardware capability includes a processor performance value and/or a storage space size. The gateway device obtains the first software package based on the performance of the first intranet device, where the performance of the first intranet device meets an installation performance requirement of the first software package. The software package to be installed on the intranet device is determined based on the performance of the intranet device. This can greatly improve an implementation effect and performance of the additional function.

Optionally, the gateway device stores a correspondence between the software package and the installation performance requirement, so that the gateway device finds the first software package from the correspondence between the software package and the installation performance requirement based on the performance of the first intranet device.

Optionally, to reduce the storage resource of the gateway device, a plurality of software packages used to perform various additional functions are stored in other devices in a distributed manner, for example, a server. In an implementation of the first aspect, the gateway device obtains the first software package in the following manner. The gateway device finds an identifier of the first software package from a correspondence between the identifier of the software package and the installation performance requirement based on the performance of the first intranet device. The gateway device sends the identifier of the first software package to the server, and receives the first software package returned by the server based on the identifier of the first software package.

Optionally, to reduce the storage resource and the processing resource of the gateway device, a function of matching the appropriate software package based on the performance of the intranet device may also be shared by a server. In an implementation of the first aspect, the gateway device obtains the first software package in the following manner. The gateway device sends the performance of the first intranet device to a server. The gateway device receives the first software package returned by the server based on the performance of the first intranet device.

Optionally, to further reduce the storage resource and the processing resource of the gateway device, a step of querying the installation performance requirement based on the type of the first intranet device and a step of obtaining the first software package based on the performance are both performed by the server. In an implementation of the first aspect, the gateway device obtains the first software package in the following manner. The gateway device sends the type of the first intranet device to a server. The gateway device receives the first software package returned by the server based on the type of the first intranet device.

Optionally, in an implementation of the first aspect, when determined first software packages for two or more different intranet devices are a same software package, a plurality of intranet devices may perform a same additional function after separately installing the same software package. This may result in a waste of resources of the intranet devices or a conflict in an implementation process of the additional function. To avoid such a possible problem, before the gateway device sends the first indication message and the first software package to the first intranet device, the gateway device identifies a type of a second intranet device, where the second intranet device belongs to the intranet. The gateway device determines performance of the second intranet device based on the type of the second intranet device. The gateway device finds a second software package from a correspondence between the software package and an installation performance requirement based on the performance of the second intranet device, where the performance of the second intranet device meets the installation performance requirement of the second software package. If the first software package and the second software package are a same software package, the gateway device selects the first intranet device from the first intranet device and the second intranet device to install the first software package. The gateway device may select the first intranet device from the first intranet device and the second intranet device in a plurality of manners, for example, randomly select the first intranet device or select the first intranet device according to a policy. For example, the gateway device selects, based on the performance of the first intranet device and the performance of the second intranet device and according to a preset selection policy, the first intranet device from the first intranet device and the second intranet device to install the first software package.

Optionally, in an implementation of the first aspect, to facilitate subsequent correct forwarding of a data flow (namely, a target data flow) on which the first additional function is to be performed, so as to correctly execute the first additional function, the gateway device stores a correspondence between an identifier of the first intranet device and the first additional function after sending the first indication message and the first software package to the first intranet device. The gateway device obtains the target data flow, where the target data flow is a data flow on which the first additional function is to be performed. The gateway device sends the target data flow to the first intranet device based on the correspondence between the identifier of the first intranet device and the first additional function, and receives a processing result of the target data flow by the first intranet device.

Further, after receiving the processing result of the target data flow by the first intranet device, the gateway device performs an action corresponding to the processing result on the target data flow based on the processing result, where the action includes forwarding, alarming, or blocking.

Optionally, in an implementation of the first aspect, to facilitate subsequent correct forwarding of a data flow (namely, a target data flow) on which the first additional function is to be performed, so as to correctly execute the first additional function, the gateway device stores a correspondence between an identifier of the first intranet device and the first additional function after sending the first indication message and the first software package to the first intranet device. The gateway device obtains the target data flow, where the target data flow is a data flow on which the first additional function is to be performed. The gateway device determines description information, where the description information is used to describe the target data flow. The gateway device sends the description information to the first intranet device based on the correspondence between the identifier of the first intranet device and the first additional function, and receives a processing result of the description information by the first intranet device. The gateway device sends the description information instead of the target data flow to the first intranet device. This can reduce an amount of data sent by the gateway device to the intranet device that performs the additional function.

Further, after receiving the processing result of the description information by the first intranet device, the gateway device performs an action corresponding to the processing result on the target data flow based on the processing result, where the action includes forwarding, alarming, or blocking.

Optionally, to improve user experience of a user, in an implementation of the first aspect, before sending the first indication message and the first software package to the first intranet device, the gateway device outputs prompt information, where the prompt information includes the correspondence between the identifier of the first intranet device and the first additional function, and the prompt information is used to prompt that the first intranet device has a capability of executing the first additional function; and receives input acknowledgment information, where the acknowledgment information is used to indicate that the first intranet device is allowed to execute the first additional function.

Optionally, the gateway device identifies the type of the first intranet device in a plurality of implementations. In an actual application process, one or more of identification manners may be selected from the plurality of implementations based on different requirements. In a first manner, the type of the first intranet device is identified from forwarded traffic. The gateway device intercepts a feature packet sent by the first intranet device, where the feature packet carries a first feature field, and content of the first feature field is used to indicate an operating system type or a preset website domain name of a sender. The gateway device queries a feature library for a first device type corresponding to the content of the first feature field, where the feature library stores a correspondence between the content of the first feature field and the first device type. The gateway device determines that a device type of the first intranet device is the first device type.

In a second manner, the type of the first intranet device is identified based on a MAC address. The gateway device obtains a MAC address of the first intranet device. The gateway device queries a device information library for a first device type corresponding to the MAC address of the first intranet device, where the device information library stores a correspondence between the MAC address of the first intranet device and the first device type. The gateway device determines that a device type of the first intranet device is the first device type.

A third manner is active scanning and detection. The gateway device sends a probe packet to the first intranet device. The gateway device receives a response packet that corresponds to the probe packet and that is sent by the first intranet device. The gateway device obtains a first identification fingerprint based on the response packet. The gateway device queries a fingerprint library for a first device type corresponding to the first identification fingerprint, where the fingerprint library stores a correspondence between the first identification fingerprint and the first device type. The gateway device determines that a device type of the first intranet device is the first device type.

Optionally, in any one of the first aspect or the implementations of the first aspect, the first additional function is a data flow security detection function, a network buffer function, or a security sandbox function. When the first additional function is the data flow security detection function, the target data flow is a to-be-detected data flow. When the first additional function is the network buffer function, the target data flow is a data flow that carries to-be-buffered content. When the first additional function is the security sandbox function, the target data flow is a data flow that carries to-be-detected file content.

According to a second aspect, a gateway device is provided, where the gateway device includes a network interface, a memory, and a processor connected to the memory. The memory is configured to store instructions. The processor is configured to execute the instructions, so that the gateway device performs the method in any one of the first aspect or the implementations of the first aspect. For details, refer to the foregoing detailed descriptions. Details are not described herein again.

According to a third aspect, a network service processing apparatus is provided. The apparatus has a function of implementing the method in any one of the first aspect or the implementations of the foregoing first aspect. The function may be implemented by hardware, or may be implemented by hardware executing corresponding software. The hardware or the software includes one or more modules corresponding to the foregoing function.

According to a fourth aspect, an embodiment of this application provides a computer storage medium, configured to store computer software instructions used by the foregoing gateway device, and including a program designed for performing the method in any one of the first aspect or the implementations of the foregoing first aspect.

According to a fifth aspect, still another aspect of this application provides a computer program product including instructions. When the computer program product runs on a computer, the computer is enabled to perform the method according to any one of the first aspect or the implementations of the first aspect.

According to a sixth aspect, an embodiment of this application provides a chip, including a memory and a processor. The memory is configured to store computer instructions, and the processor is configured to invoke and run the computer instructions in the memory to perform the method in any one of the first aspect and the implementations of the first aspect.

BRIEF DESCRIPTION OF DRAWINGS

To describe technical solutions in embodiments of this application more clearly, the following briefly describes accompanying drawings used in describing the embodiments. It is clear that the accompanying drawings in the following description show some embodiments of this application, and a person of ordinary skill in the art may still derive other accompanying drawings from these accompanying drawings without creative efforts.

DESCRIPTION OF EMBODIMENTS

Integrating more additional functions on a gateway device likely makes the gateway device become a performance bottleneck while the gateway device provides convenience for a user. Particularly, in a scenario in which there are a large number of hosts in an enterprise local area network connected to the gateway device, or in a scenario in which performance of a home router used as a home local area network gateway is low, the gateway device often cannot support integration of increasing additional functions.

In view of the current situation, an embodiment of this application provides a network service processing method. According to the method, under management and control of the gateway device, an intranet device in an intranet connected to the gateway device executes an additional function. Therefore, a portion of load of performing the additional function by the gateway device is transferred to the intranet device. This can reduce processing load of the gateway device, and provide a solution for implementing the additional function by the gateway device at low costs. The gateway device first identifies a type of the intranet device in the connected intranet; and further sends, to the intranet device based on the type of the intranet device, an appropriate software package used to implement the additional function. The intranet device implements the corresponding additional function after installing the software package.

Main implementation principles and implementations of technical solutions in embodiments, and corresponding beneficial effects that the technical solutions in the embodiments can achieve are described in detail below with reference to accompanying drawings.

Figure 1:
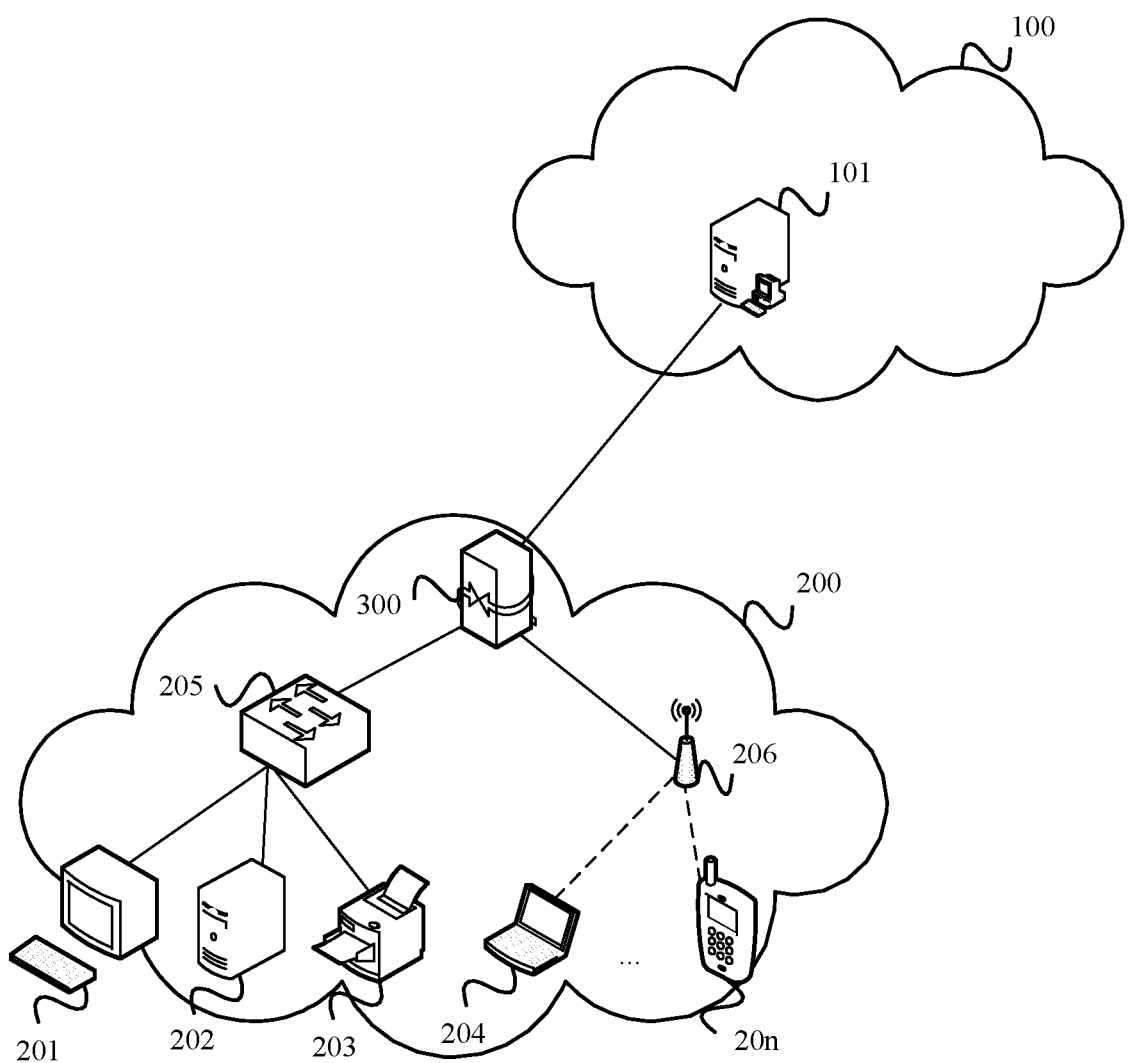
FIG. 1 is a diagram of an application scenario of a network service processing solution according to an embodiment of this application.

FIG. 1 is a diagram of an application scenario of a network service processing solution according to an embodiment of this application. This application scenario includes two networks: an extranet 100 and an intranet 200. A gateway device 300 is configured to connect the extranet and the intranet 200. Optionally, the extranet is the internet, and the intranet is a local area network established by an enterprise or an organization, a campus, or home, or a campus network (CAN) including a plurality of local area networks.

The intranet 200 includes several intranet devices, which are denoted as an intranet device 201 to an intranet device 20n, where n is a natural number greater than 1. A quantity of intranet devices is limited by intranet address space, and the quantity of intranet devices is not specifically limited in this embodiment of this application. The intranet device includes but is not limited to a device that has a computing capability and a network connection capability, for example, a personal computer, a server, a notebook computer, a virtual machine, a wearable device, a mobile phone, a smart screen television, a floor sweeping robot, a projector, a tablet computer, a switch, or a wireless access point (AP) device.

Optionally, the gateway device 300 in this embodiment of this application includes a device, for example, a router, a firewall, or a layer-3 switch. The router further includes an access router (for example, a home router), an enterprise-level router, a backbone-level router, and the like.

A network service processing system provided in this embodiment of this application includes the gateway device 300 and at least one intranet device of the intranet device 201 to the intranet device 20n in FIG. 1.

The gateway device 300 is configured to: identify a type of a first intranet device, where the first intranet device is an intranet device in the intranet device 201 to the intranet device 20n in FIG. 1; obtain a first software package based on the type of the first intranet device, where the first software package is used to implement a first additional function; and send a first indication message and the first software package to the first intranet device, where the first indication message is used to indicate the first intranet device to install the first software package and execute the first additional function. Types of the intranet devices are categories obtained by classifying the intranet devices based on functions, usage characteristics, and other factors. The type of the intranet device includes a personal computer, a server, a mobile terminal, a printer, a smart home device, and the like. A type of the notebook computer, the mobile phone, the tablet computer, and the like mentioned above is the mobile terminal, and a type of the smart screen television, the floor sweeping robot, and the projector is the smart home device.

Additional functions in this embodiment of this application include but are not limited to a data flow security detection function such as a firewall function, a network buffer function, a security sandbox function, and the like. The firewall function includes filtering, according to a preset rule set, a forwarded packet between a local area network and the internet. The security sandbox function includes running unknown specific types of content, for example, a file or a web page, in a virtual running environment. The network buffer function includes buffering a file that meets a condition, for example, a video file or an audio file that exceeds a preset size.

The intranet device is configured to: receive the first indication message and the first software package that are sent by the gateway device; and execute the first additional function after installing the first software package based on the first indication message.

Optionally, based on performance corresponding to different types of intranet devices, the gateway device 300 selects appropriate software packages for the intranet devices to implement additional functions. The gateway device 300 stores various software packages used to implement different additional functions, and an installation performance requirement corresponding to each software package (for example, a requirement for software package installation, a CPU processing rate requirement, or a storage space size requirement). In a process of obtaining the first software package based on the type of the first intranet device, the gateway device 300 first determines performance of the first intranet device based on the type of the first intranet device, where the performance includes a software capability and a hardware capability, the software capability includes whether software package installation is supported, and the hardware capability includes a processor performance value and/or a storage space size. Optionally, the software capability further includes whether necessary supporting software is installed, a version of a current operating system, and the like. The gateway device 300 obtains the first software package based on the performance of the first intranet device, where the performance of the first intranet device meets an installation performance requirement of the first software package. For example, the gateway device 300 finds the first software package from a correspondence between the software package and the installation performance requirement based on the performance of the first intranet device.

Optionally, in a scenario in which the intranet includes a plurality of intranet devices, the gateway device 300 can identify types of at least two intranet devices. In this case, the gateway device 300 selects one of the intranet devices to install the first software package. The gateway device 300 identifies the types of the at least two intranet devices, and obtains performance of each of the at least two intranet devices. If there are the at least two intranet devices, for example, if the performance of the first intranet device and performance of a second intranet device both meet the installation performance requirement of the first software package, the gateway device 300 selects one intranet device, for example, the first intranet device, from the at least two intranet devices, to install the first software package. In this case, the gateway device 300 may select, according to a plurality of selection policies, an intranet device to install the first software package. Optionally, the gateway device 300 randomly selects an intranet device from the first intranet device and the second intranet device to install the first software package. Alternatively, the gateway device 300 selects an intranet device with higher performance from the first intranet device and the second intranet device to install the first software package. Alternatively, the gateway device 300 selects, according to a topology structure of the intranet from the first intranet device and the second intranet device, an intranet device with a shorter distance from the gateway device 300 to install the first software package. The selection policies are not enumerated herein.

Optionally, after the gateway device 300 sends the first indication message and the first software package to the first intranet device, to help subsequently send a target data flow that is a data flow on which the first additional function is to be performed, and/or description information of the target data flow to the first intranet device that implements the first additional function, the gateway device 300 further needs to record a correspondence between an identifier of the first intranet device and the first additional function. Further, after sending the target data flow and/or the description information to the first intranet device based on the correspondence between the identifier of the first intranet device and the first additional function, the gateway device 300 further receives a processing result returned by the first intranet device. Optionally, for some additional functions, the gateway device 300 is further configured to perform an action corresponding to the processing result on the target data flow based on the processing result, where the action includes forwarding, alarming, or blocking.

Optionally, the gateway device 300 identifies the type of the first intranet device in one of a plurality of manners or a combination of at least two manners. For example, the gateway device 300 determines the type of the intranet device according to a configuration table, where the configuration table stores a correspondence between identifiers of intranet devices and types of the devices, and the configuration table is generated based on data input by an administrator. In addition, the gateway device 300 may further identify the type of the first intranet device in real time in other active or passive manners. These manners include but are not limited to: a manner 1 in which the type of the first intranet device is obtained from a feature packet, a manner 2 in which the type of the first intranet device is identified based on a media access control (MAC) address of the first intranet device, and a manner 3 in which the type of the first intranet device is determined through active detection and scanning.

Optionally, to reduce a storage resource of the gateway device 300, the software package may be stored in a server (for example, a server 101 in FIG. 1) instead of being stored in the gateway device 300. The gateway device 300 does not need to store the correspondence between the software package and the installation performance requirement, but stores a correspondence between an identifier of the software package and the installation performance requirement. In this case, the gateway device 300 finds the identifier of the first software package from the correspondence between the identifier of the software package and the installation performance requirement, sends the identifier of the first software package to the server 101, and receives the first software package correspondingly returned by the server. The server 101 is configured to send the stored first software package to the gateway device 300 based on the received identifier of the first software package.

Optionally, to further reduce an occupied processing resource of the gateway device 300, the foregoing step of obtaining the first software package based on the performance of the first intranet device may be performed by the server 101 in FIG. 1. In this case, the gateway device 300 sends the performance of the first intranet device to the server, and the gateway device 300 receives the first software package correspondingly returned by the server 101. The server 101 stores the correspondence between the software package and the installation performance requirement, receives the performance of the first intranet device sent by the gateway device 300, finds the first software package from the correspondence between the software package and the installation performance requirement, and sends the found first software package to the gateway device 300.

Optionally, to further reduce an occupied processing resource of the gateway device 300, the foregoing step of querying the installation performance requirement based on the type of the first intranet device may also be performed by the server 101 in FIG. 1. In this case, after identifying the type of the first intranet device, the gateway device 300 sends the type of the first intranet device to the server, and receives the first software package correspondingly returned by the server. The server 101 determines the performance of the first intranet device based on the type of the first intranet device, and then obtains the first software package based on the performance of the first intranet device. For example, the first software package is found from the correspondence between the software package and the installation performance requirement. The server 101 sends the obtained first software package to the gateway device 300.

Optionally, the server 101 may be deployed in the intranet 200 (not shown in FIG. 1) or the extranet 100 (shown in FIG. 1). When the server 101 is deployed in the extranet 100, the server 101 can support a plurality of different intranets to implement the network service processing solution provided in this embodiment of this application. The server 101 is also referred to as a "cloud server". An owner of the cloud server is a telecom operator or a third-party organization other than the telecom operator and an intranet owner, and customers of the cloud server are several intranets 200. The cloud server is managed by the telecom operator or the third-party organization other than the telecom operator and the intranet owner, and provides supporting services for a plurality of different intranets by opening dedicated ports. After successful registration and authentication, the intranet 200 communicates and interacts with the cloud server over a general protocol or a proprietary protocol.

Figure 2:
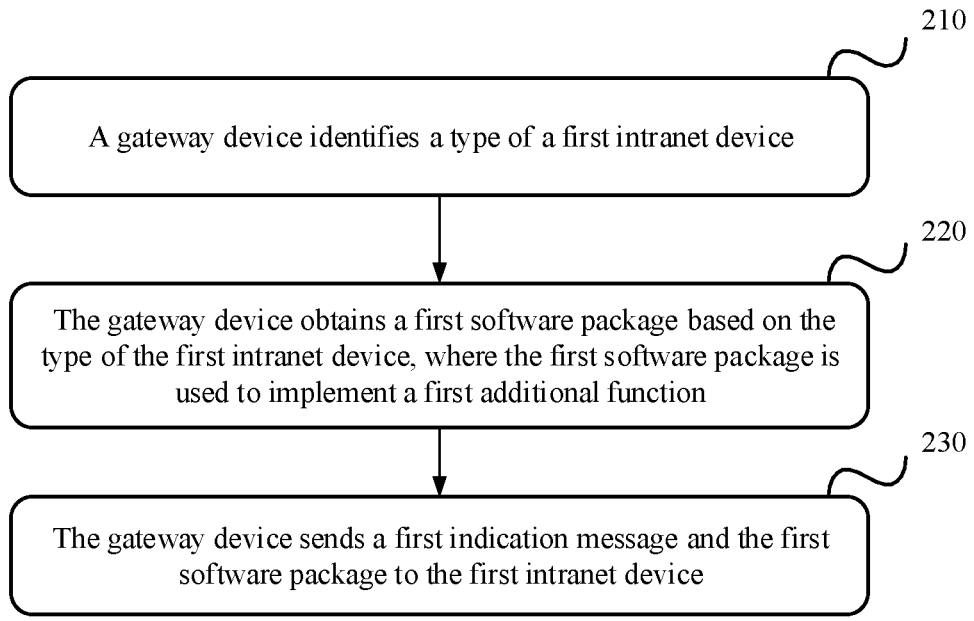
FIG. 2 is a flowchart of a network service processing method according to an embodiment of this application.

FIG. 2 is a flowchart of a network service processing method according to an embodiment of this application. The network service processing method is executed by a gateway device, for example, the gateway device 300 in FIG. 1. The network service processing method provided in this embodiment of this application includes the following steps.

Step 210: The gateway device identifies a type of a first intranet device. It should be noted that "first" and "second" in the "first intranet device" and a "second intranet device" that appears later are not subject to a sequence, but are intended to distinguish different intranet devices. The first, second, and the like in the following descriptions are also used to distinguish different information, messages, or the like.

The first intranet device belongs to an intranet connected to the gateway device. For example, the first intranet device is the intranet device 201 in FIG. 1.

Based on a type of an intranet device, the gateway device may roughly determine whether the intranet device is appropriate for performing an additional function and which additional functions can be performed by the intranet device. For example, if an intranet device is a mobile terminal, because a location of the mobile terminal frequently changes, the intranet device is inappropriate for performing an additional function. If the mobile terminal is designated to perform an additional function, the additional function performed by the mobile terminal is unavailable when the mobile terminal is taken out of a scope of the intranet by a user. As a result, the additional function is unstable. For another example, if an intranet device is a printer, because storage and processing performance of the printer is usually limited, it is inappropriate to perform an additional function that consumes a large amount of storage resources and processing resources, and it is more appropriate to perform an additional function that consumes a small amount of storage resources and processing resources.

Optionally, the gateway device identifies the type of the intranet device in one or more manners, including but not limited to the following several manners. For example, the gateway device preferably identifies a type of an intranet device in one of the manners. When the type of the intranet device cannot be successfully identified, the gateway device attempts to identify the type of the intranet device in another manner.

Manner 0: The type of the intranet device is determined according to a stored configuration table.

The gateway device generates the configuration table based on data input by an administrator, where the configuration table stores correspondences between identifiers of intranet devices (for example, an internet protocol (IP) address of an intranet device) and types of the devices. Optionally, the administrator uses an input device connected to an input/output interface of the gateway device to input related data of an intranet device in a command line interface of the gateway device or a user interface of another application software such as a network management software. The data includes an IP address of the intranet device and a type of the intranet device. Further, the administrator may input information such as a vendor and a specific model of the intranet device. The gateway device generates, based on the foregoing data, an entry corresponding to the intranet device in the configuration table, where the entry includes the IP address of the intranet device and the type of the intranet device.

When the gateway device subsequently needs to determine the type of the intranet device, the gateway device queries, based on the IP address of the intranet device, the configuration table for the entry that includes the IP address, and obtains the type of the intranet device from the found entry.

Figure 3:
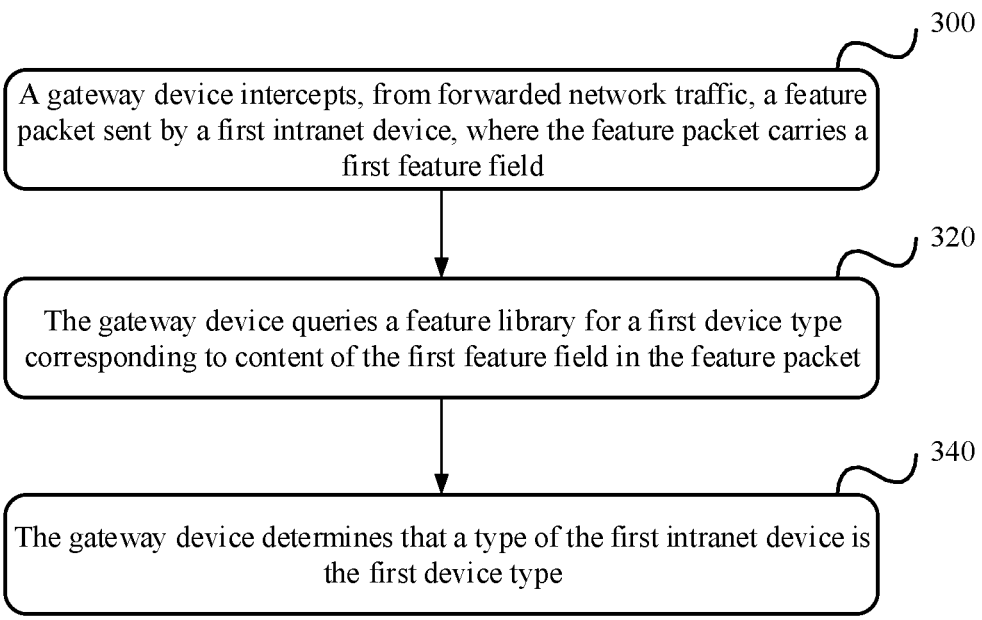
FIG. 3 is a flowchart of a manner 1 of identifying a type of an intranet device according to an embodiment of this application.

Manner 1: The type of the first intranet device is obtained from a forwarded feature packet. FIG. 3 is a flowchart of a manner 1 of identifying a type of an intranet device according to an embodiment of this application.

Step 300: The gateway device intercepts, from forwarded network traffic, a feature packet sent by the first intranet device, where the feature packet carries a first feature field, and content of the first feature field is used to indicate an operating system type or a preset website domain name of a sender. Optionally, the preset website domain name includes a domain name of a device upgrade website.

Step 320: The gateway device queries a feature library for a first device type corresponding to the content of the first feature field in the feature packet, where the feature library stores a correspondence between the content of the first feature field and the first device type.

Step 340: The gateway device determines that the type of the first intranet device is the first device type.

For example, the feature packet is a hypertext transfer protocol (HTTP) packet that is sent by the intranet device and that carries a User-Agent field. In a portal authentication process, the intranet device sends the HTTP packet that carries the User-Agent field.

The following provides examples of specific content of two feature fields.

In an example 1, content of the User-Agent field is "Android 8.0.0;VTR-L09 Build/HUAWEIVTR-L09". Content of a User-Agent field in an HTTP packet sent by a mobile phone whose model is HUAWEI P10 in a portal authentication process includes "Android 8.0.0;VTR-L09 Build/HUAWEIVTR-L09".

In an example 2, content of the User-Agent field is "Windows NT 6.1;Win64;x64". Content of a User-Agent field in an HTTP packet sent by a personal computer in a portal authentication process includes "Windows NT 6.1; Win64;x64".

The feature library of the gateway device pre-stores a correspondence between "Android 8.0.0;VTR-L09 Build/ HUAWEIVTR-L09" and a device type "mobile terminal", and a correspondence between "Windows NT 6.1;Win64; x64" and a device type "personal computer". After obtaining the content of the User-Agent field by parsing the feature packet sent by the first intranet device, the gateway device compares the content of the User-Agent field obtained through parsing with each feature field in the feature library. If the content of the User-Agent field obtained through parsing includes "Android 8.0.0;VTR-L09 Build/HUAWEIVTR-L09", it is determined that the type of the first intranet device is the mobile terminal. If the content of the User-Agent field obtained through parsing includes "Windows NT 6.1;Win64;x64", it is determined that the type of the first intranet device is the personal computer.

The feature packet may alternatively be a DHCP packet that is sent by the intranet device and that carries an option field. Content in a request parameter list field (namely, an Option 55 field), a vendor ID field (namely, an Option 60 field), and a host name field (namely, an Option 12 field) in the Option field may also be used to identify the type of the intranet device that sends the DHCP packet carrying the option field.

The feature packet may alternatively be a probe request packet and/or an association request packet sent by the intranet device to an AP.

Other feature packets are not enumerated herein.

The feature library is pre-configured by an administrator; or may be obtained from a public website, for example, https://fingerbank.inverse.ca.

Figure 4:
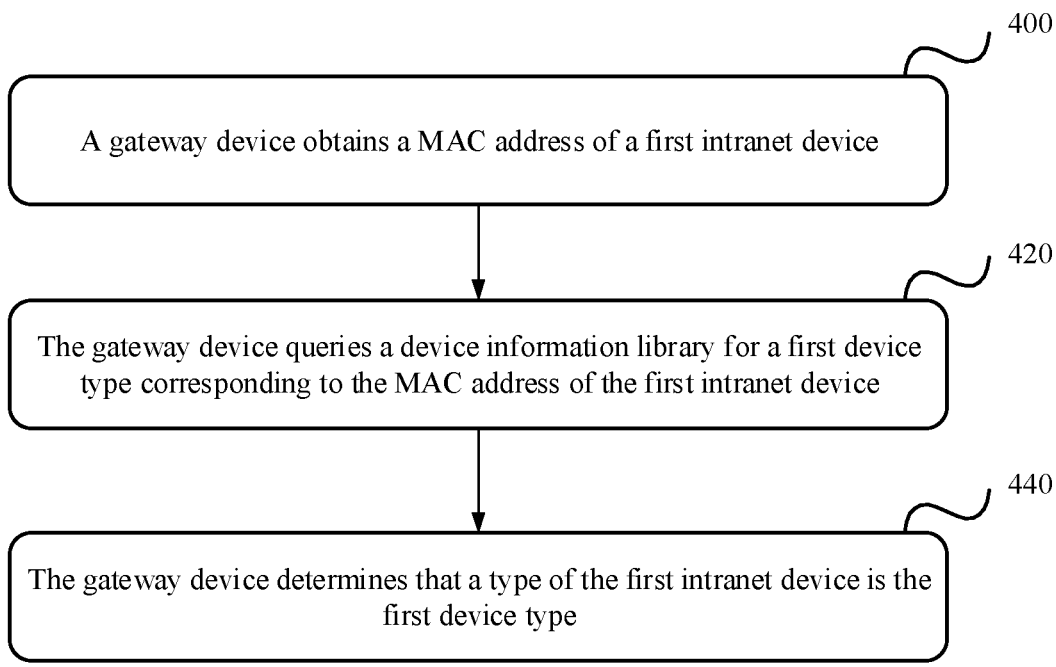
FIG. 4 is a flowchart of a manner 2 of identifying a type of an intranet device according to an embodiment of this application.

Manner 2: The type of the first intranet device is identified based on a MAC address. FIG. 4 is a flowchart of a manner 2 of identifying a type of an intranet device according to an embodiment of this application.

Step 400: The gateway device obtains a MAC address of the first intranet device. For example, the gateway device obtains the MAC address of the first intranet device from a packet header of a forwarded IP packet, or the gateway device sends an ARP request to the first intranet device and obtains the MAC address of the first intranet device from a corresponding address resolution protocol (ARP) response.

Step 420: The gateway device queries a device information library for a first device type corresponding to the MAC address of the first intranet device, where the device information library stores a correspondence between the MAC address of the first intranet device and the first device type. The device information library is pre-stored. For example, when an administrator of the gateway device adds a new device to the intranet and configures a parameter such as a network for the new intranet device, the administrator of the gateway device inputs a MAC address of the new intranet device and a device type of the new intranet device on the gateway device by using an input device connected to the gateway device, and stores the MAC address and the device type of the new intranet device. Alternatively, the device information library is downloaded by the gateway device from a website supported by a manufacturer of the intranet device.

Step 440: The gateway device determines that the type of the first intranet device is the first device type.

For example, the first 3 bytes of the MAC address constitute a MAC organizationally unique identifier (OUI). MAC OUIs are all assigned by the Institute of Electrical and Electronics Engineers (IEEE) to various equipment vendors, and may be used to identify companies disclosed by the IEEE. There are correspondences between device vendors and device types. For example, some vendors produce only printer devices, and some vendors produce only mobile terminal devices.

The device information library may be manually established, or may be established based on public information on websites of some vendors. For example, refer to the IEEE MAC OUI rule library http://standards-oui.ieee.ory/oui/oui.txt.

Figure 5:
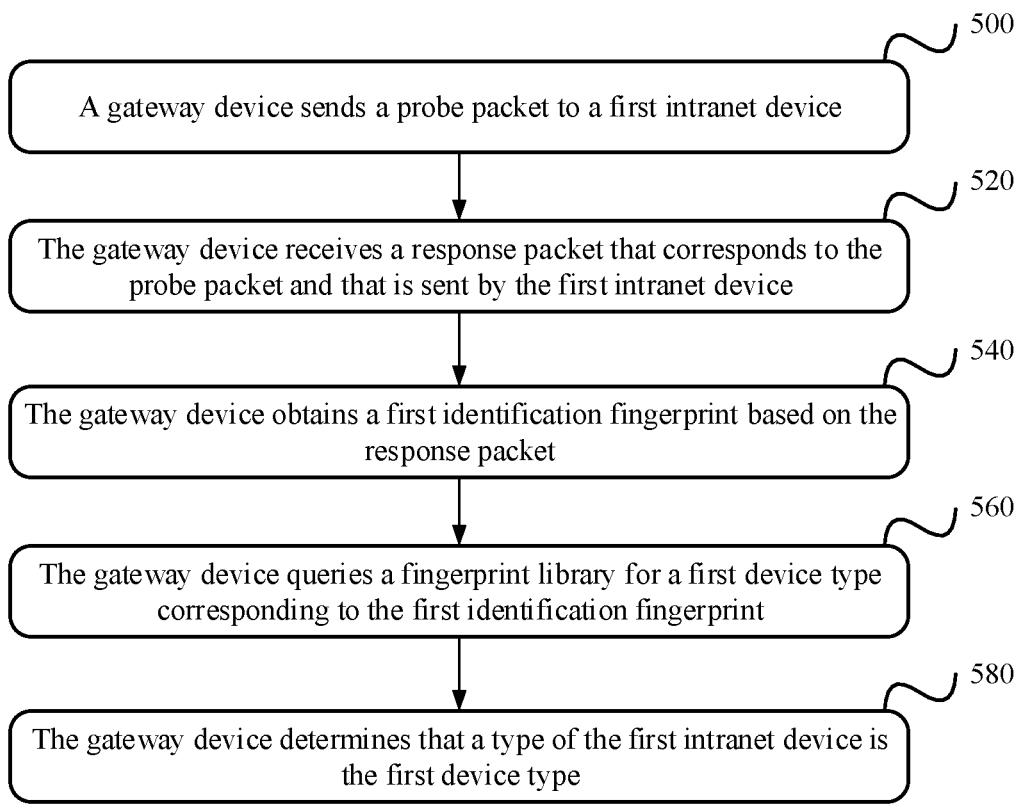
FIG. 5 is a flowchart of a manner 3 of identifying a type of an intranet device according to an embodiment of this application.

Manner 3: The type of the first intranet device is identified through active detection and scanning. The gateway device sends a probe packet to the first intranet device, and identifies the type of the first intranet device based on a corresponding response packet. FIG. 5 is a flowchart of a manner 3 of identifying a type of an intranet device according to an embodiment of this application.

Step 500: The gateway device sends the probe packet to the first intranet device.

Step 520: The gateway device receives a response packet that corresponds to the probe packet and that is sent by the first intranet device.

Step 540: The gateway device obtains a first identification fingerprint based on the response packet.

Step 560: The gateway device queries a fingerprint library for a first device type corresponding to the first identification fingerprint, where the fingerprint library stores a correspondence between the first identification fingerprint and the first device type.

Step 580: The gateway device determines that the type of the first intranet device is the first device type.

For example, one or more pieces of scanner software are pre-installed on the gateway device. The scanner software includes but is not limited to a vulnerability scanner Nessus launched by Tenable, an open-source scanning tool Nmap, a network tool netcat of a Unix operating system platform, and the like. The gateway device runs the scanner software to actively send a probe packet to an intranet device; obtains an identification fingerprint from a corresponding response packet; and identifies, based on the identification fingerprint, a type of the intranet device that serves as a scanned object.

For example, when scanning an intranet device by using the Nmap, the gateway device sends one or more specially constructed probe packets. The gateway device receives one or more response packets corresponding to the intranet device, and generates an identification fingerprint based on the following field values in the response packets. A field used to generate the identification fingerprint in the response packet includes one or a combination of the following: SEQ, OPS, WIN, T1 to T7, IE, ECN, and U1. Then, the gateway device queries the fingerprint library for a corresponding device type by using the generated identification fingerprint as an index.

A fingerprint library provided by Nmap 7.70 includes 5652 fingerprints stored in a plaintext. These fingerprints correspond to 28 device types.

Return to a procedure shown in FIG. 2. After identifying the type of the first intranet device in step 210, the gateway device performs step 220.

Step 220: The gateway device obtains a first software package based on the type of the first intranet device, where the first software package is used to implement a first additional function.

Optionally, the gateway device stores correspondences between types of intranet devices and software packages, as shown in Table 1. After identifying the type of the first intranet device, the gateway device finds, from the correspondences shown in Table 1, the software package corresponding to the type of the first intranet device.

The software package is a program or a group of programs that has/have a specific function and is/are used to accomplish a specific task. For ease of description and differentiation, in this embodiment of this application, a character string with a suffix is used to indicate the software package, and a character string without the suffix is used to indicate an identifier of the software package (a name of the software package). For example, "Firewall.exe" indicates a software package used to implement a security detection additional function such as a firewall, and Firewall indicates an identifier of the software package.

TABLE 1

| Entry No. | Intranet device type | Software package |
| --- | --- | --- |
| 1 | Mobile terminal | NULL |
| 2 | Printer | NULL |
| 3 | Personal computer | Firewall.exe |
| 4 | Server | Firewall.exe, Websandbox.exe, and networkstorage.exe |
| 5 | Smart home device | NULL |

Optionally, the correspondences between the types of the intranet devices and the software packages are stored in a plurality of possible storage forms. For example, the correspondences actually stored are correspondences between the types of the intranet devices and storage locations of the software packages in a file system of the gateway device, or correspondences between the types of the intranet devices and identifiers of the software packages. The storage location includes but is not limited to a path in the file system. If the correspondences between the types of the intranet devices and the storage locations of the software packages in the file system of the gateway device are stored, the gateway device obtains the first software package from a storage location after finding the storage location of the corresponding first software package based on the type of the first intranet device. If the correspondences between the types of the intranet devices and the identifiers of the software packages are stored, the gateway device finds the first software package in the file system of the gateway device after finding an identifier of the corresponding first software package based on the type of the first intranet device.

Optionally, because there is usually a one-to-one correspondence between a software package and an additional function, the correspondences shown in Table 1 may alternatively be replaced with correspondences between the types of the intranet devices and additional functions. In this case, after identifying the type of the first intranet device, the gateway device finds, from the correspondences between the types of the intranet devices and the additional functions, the additional function corresponding to the type of the first intranet device, and further obtains the software package used to implement the additional function. Alternatively, the correspondences shown in Table 1 may include both the software packages and additional functions corresponding to the software packages.

Step 230: The gateway device sends a first indication message and the first software package to the first intranet device. The first indication message is used to indicate the first intranet device to install the first software package and execute the first additional function. For example, the first indication message includes the identifier of the first software package and an operator, and the operator corresponds to an installation operation and a running operation. The identifier of the first software package includes a name of the first software package, a hash value of the first software package, and the like.

Optionally, to improve use experience of a user and ensure a right to know of the user, before sending the first software package and the first indication message to the first intranet device, the gateway device notifies the administrator that the first intranet device can execute the first additional function. After receiving a confirmation indication of the administrator, the gateway device performs step 230. Optionally, a notification manner includes but is not limited to: prompting the administrator by using an output device connected to the gateway device, sending an SMS message to a mobile phone used by the administrator, sending an email to the administrator, and sending a message to the administrator by using instant messaging software such as WeChat or Microsoft Network (MSN).

According to the network service processing method provided in this embodiment of this application, the gateway device serves as a management control entity for implementing an additional function. The gateway device first identifies a type of an intranet device; sends, to the intranet device based on the type of the intranet device, a software package used to implement an appropriate additional function; and indicates the intranet device to implement the additional function after successfully installing the software package. A portion of load of performing the additional function is transferred from the gateway device to the intranet device. Therefore, processing load of the gateway device is reduced. This can reduce a processing resource and a storage resource of the gateway device, and provide a solution for implementing the additional function by the gateway device at low costs. Furthermore, the solution uses an idle resource of the intranet device to implement the additional function, thereby improving utilization of an intranet resource. In addition, in this solution, each additional function corresponds to an independent software package. Each time an additional function is added, only a corresponding software package needs to be developed. Performing the new additional function does not significantly increase the load of the gateway device, and therefore the solution further has better scalability.

In the network service processing method shown in FIG. 2, in step 220, the gateway device obtains the first software package based on the correspondences between the types of the intranet devices and the software packages shown in Table 1. This manner is quick and effective. However, in an actual implementation scenario, there are usually a plurality of types of intranet devices, and performance of these intranet devices greatly varies. A method in step 220 can implement only coarse-grained matching between the intranet devices and software packages (or additional functions). In an implementation, the software package may fail to be installed, or an implementation effect of the additional function is not effective. For example, the software package fails to be installed because the performance of the intranet device cannot actually meet a requirement for implementing the additional function. Alternatively, because the performance of the intranet device is very low, a running speed of the software package is very slow after installation, and an implementation effect of the additional function is poor.

Figure 6:
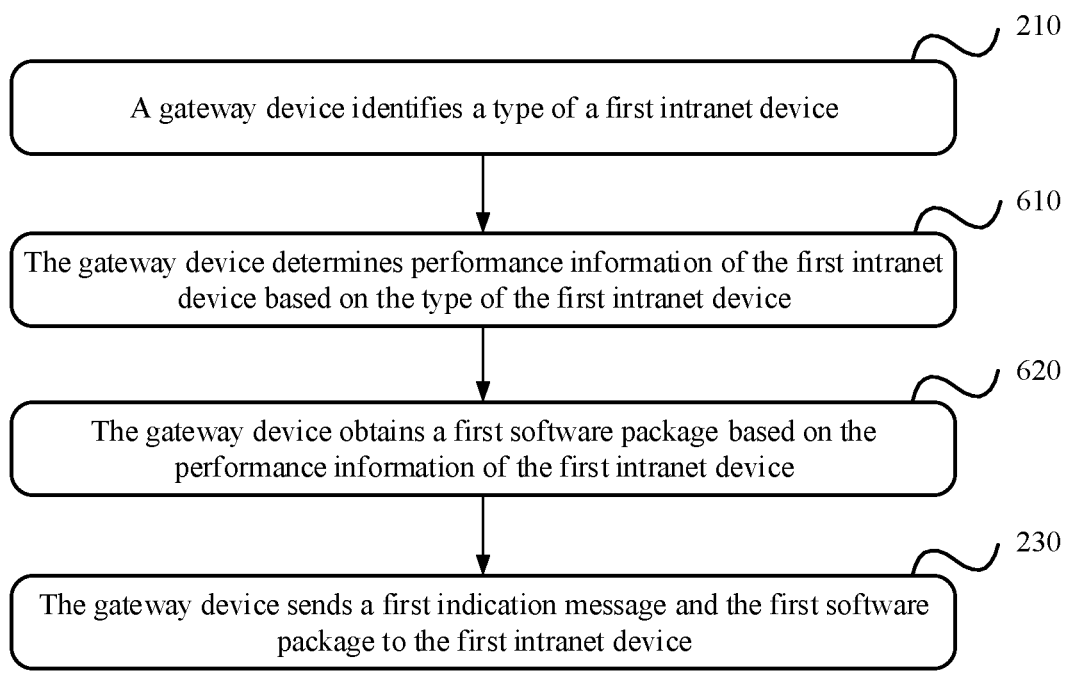
FIG. 6 is a flowchart of a method for selecting, based on performance of an intranet device, a software package installed by the intranet device according to an embodiment of this application.

Improved accuracy of matching between the intranet devices and the software packages (or the additional functions) can greatly improve an implementation effect and performance of the additional function. For example, the type of the first intranet device is the server, and a type of the second intranet device is the personal computer. Although both the first intranet device and the second intranet device can support an additional function that consumes a large amount of storage resources and processing resources, because performance of the first intranet device is significantly higher than that of the second intranet device, for example, the first intranet device has a larger memory capacity and a larger processor rate, a better effect can be obtained when the first intranet device executes the additional function that consumes the large amount of storage resources and processing resources. Therefore, an embodiment of this application provides a method for selecting, based on performance of an intranet device, a software package installed by the intranet device, as shown in FIG. 6. A process shown in FIG. 6 is an alternative method for performing step 220 "the gateway device obtains a first software package based on the type of the first intranet device" in FIG. 2.

Step 610: The gateway device determines performance of the first intranet device based on the type of the first intranet device. The performance includes a software capability and a hardware capability, the software capability includes whether software package installation is supported, and the hardware capability includes a processor performance value, a storage space size, and the like.

Optionally, the gateway device stores correspondences between types of intranet devices and performance, as shown in Table 2. After identifying the type of the first intranet device, the gateway device may find the performance of the first intranet device from the correspondences between the types of the intranet devices and the performance shown in Table 2.

Optionally, the type of the intranet device further includes a manufacturer and/or model information of the intranet device. In other words, the type of the intranet device is further classified. After identifying the type of the first intranet device that includes the manufacturer and/or the model information in step 210 in FIG. 2, the gateway device may find the more accurate performance from the correspondences between the types of the intranet devices and the performance shown in Table 2.

TABLE 2

| Entry No. | Intranet device type | Intranet device model | Performance |
| --- | --- | --- | --- |
| 1 | Mobile terminal | HUAWEI P10 | |
| 2 | Printer | H-laser | Memory: 512 MB |
| 3 | Personal computer | H-TG01 | CPU: 2 GHz |
| | | | Memory: 512 MB |
| | | | Hard disk capacity: 256 GB |
| 4 | | D-VOSTRO | CPU: 1 GHz |
| | | | Memory: 256 MB |
| | | | Hard disk capacity: 256 GB |
| 5 | Server | D-R4 | CPU: 2.6 GHz |
| | | | Memory: 64 GB |
| | | | Hard disk capacity: 8 TB |
| 6 | | D-R7 | CPU: 1.7 GHz |
| | | | Memory: 32 GB |
| | | | Hard disk capacity: 6 T |

Step 620: The gateway device obtains the first software package based on the performance of the first intranet device. The performance of the first intranet device meets an installation performance requirement of the first software package.

Optionally, the gateway device stores an installation performance requirement corresponding to each software package, as shown in Table 3. After obtaining the performance of the first intranet device, the gateway device compares the performance of the first intranet device with the installation performance requirement corresponding to each software package. If main performance of the first intranet device is higher than the installation performance requirement of the first software package, the gateway device determines that the performance of the first intranet device meets the installation performance requirement of the first software package.

TABLE 3

| Entry No. | Software package | Installation performance requirements |
| --- | --- | --- |
| 1 | networkstorage.exe | CPU: 128 MHz |
| | | Memory: 32 M |
| | | Hard disk capacity: 512 M |
| 2 | Firewall.exe | CPU: 1 GHz |
| | | Memory: 512 M |
| | | Hard disk capacity: 512 M |
| 3 | Websandbox.exe | CPU: 1 GHz |
| | | Memory: 1 G |
| | | Hard disk capacity: 256 G |

For example, it is assumed that the type of the first intranet device is a model H-TG01 personal computer. In this case, the performance of the first intranet device meets installation performance requirements of the software packages networkstorage.exe and Firewall.exe, but does not meet an installation performance requirement of the software package Websandbox.exe. In this case, the first software package is a software package named networkstorage.exe or a software package named Firewall.exe.

It is assumed that the type of the first intranet device is a model D-R7 server. In this case, the performance of the first intranet device meets installation performance requirements of the software packages networkstorage.exe, Firewall.exe, and Websandbox.exe. In this case, the first software package is a software package named networkstorage.exe, a software package named Firewall.exe, or a software package named Websandbox.exe.

In this embodiment of this application, after identifying the type of the first intranet device, the gateway device obtains the performance of the first intranet device based on the type of the first intranet device, and then compares the performance of the first intranet device with the installation performance requirement of the software package to ensure that the performance of the first intranet device meets the installation performance requirement of the selected first software package. In this way, a failure rate of installing the software package or running the software package by the first intranet device can be reduced, and a success rate of installing the software package by the first intranet device can be improved. This can improve an implementation effect of the additional function.

Optionally, when the intranet 200 in FIG. 1 includes a plurality of intranet devices, the gateway device 300 concurrently identifies types of the plurality of intranet devices. After the types of the plurality of intranet devices are identified, first software packages determined for two or more different intranet devices may be a same software package according to the method shown in FIG. 2 or FIG. 6. In this case, if the gateway device 300 sends the same software package to the two or more intranet devices, these intranet devices perform a same additional function after installing the same software package. This may result in a waste of resources of the intranet devices or a conflict in an implementation process of the additional function. To avoid such a problem, when the first software packages determined by the gateway device 300 for the plurality of different intranet devices are the same software package, the gateway device 300 needs to select one intranet device from the plurality of intranet devices. The gateway device 300 sends the first software package to the selected intranet device instead of sending the same software package to the plurality of intranet devices at the same time. In the method shown in FIG. 2, before step 230, the method further includes: The gateway device 300 obtains the first software package based on a type of a second intranet device. The gateway device 300 selects the first intranet device from the first intranet device and the second intranet device, and sends the first indication message and the first software package to the first intranet device instead of sending the first indication message and the first software package to the second intranet device.

Similarly, in the network service processing method shown in FIG. 6, if the first software packages determined for the two or more different intranet devices are the same software package, one of the intranet devices may alternatively be selected for subsequently installing the first software package based on performance of the two intranet devices. A network service processing method in this case is shown in FIG. 7.

Figure 7:
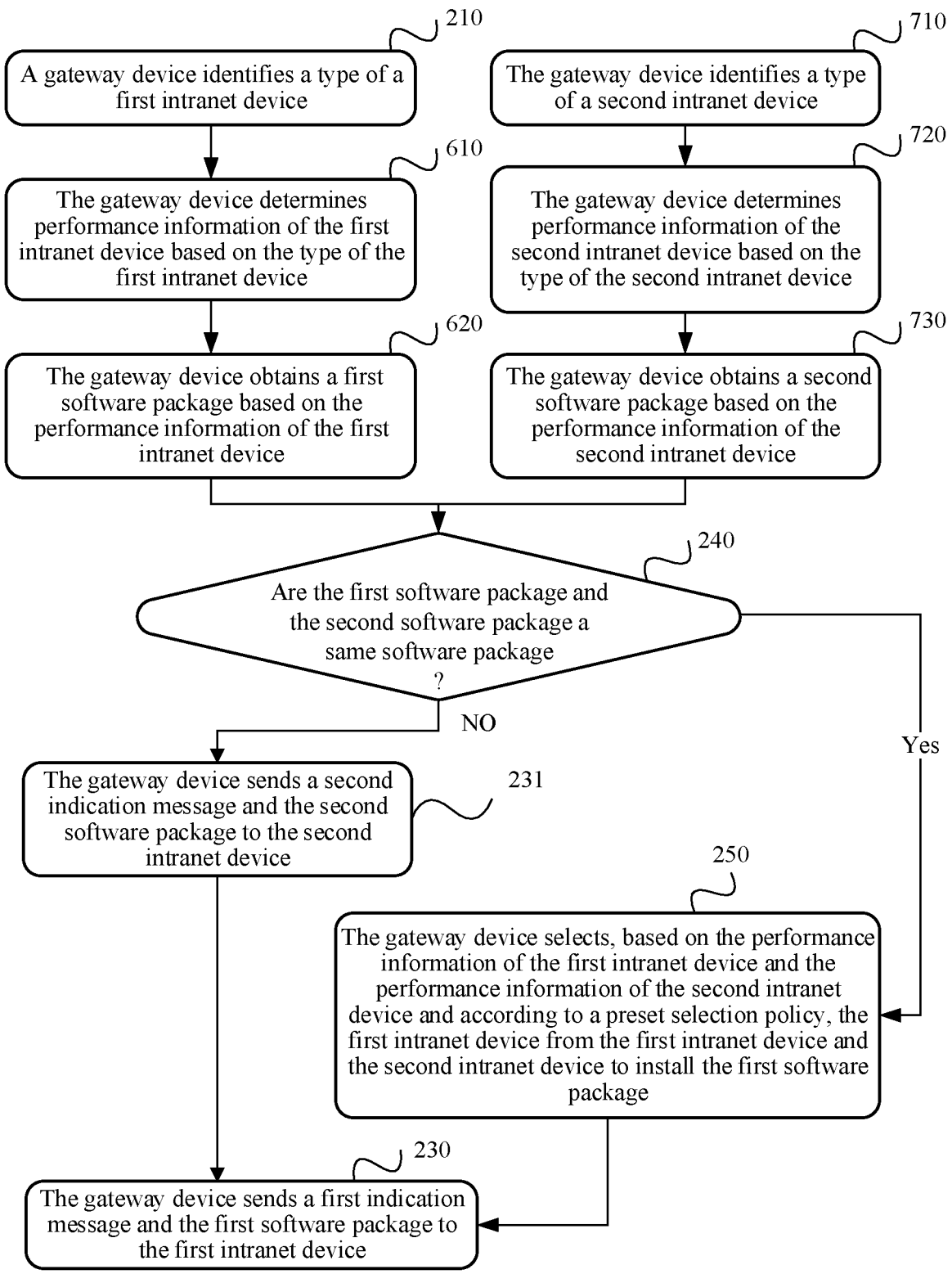
FIG. 7 is a flowchart of another network service processing method according to an embodiment of this application.

The network service processing method shown in FIG. 7 includes the following steps.

For steps 210, 610, 620, and 230, refer to FIG. 6 and the related descriptions. Details are not repeated herein.

Before step 230, the method further includes:

Step 710: The gateway device identifies the type of the second intranet device, where the second intranet device belongs to the intranet connected to the gateway device.

Step 720: The gateway device determines performance of the second intranet device based on the type of the second intranet device.

Step 730: The gateway device finds a second software package from a correspondence between the software package and an installation performance requirement based on the performance of the second intranet device, where the performance of the second intranet device meets the installation performance requirement of the second software package.

Implementation principles of step 710 to step 730 are respectively similar to step 210 in FIG. 2 and steps 610 and 620 in FIG. 6, and are not repeated herein.

Step 240: The gateway device determines whether the first software package and the second software package are a same software package; and if the first software package and the second software package are different software packages, performs step 230 and step 231. Step 231: The gateway device sends a second indication message and the second software package to the second intranet device, where the second indication message is used to indicate the second intranet device to install the second software package and execute a second additional function.

If the first software package and the second software package are the same software package, step 250 is performed.

Step 250: The gateway device selects, based on the performance of the first intranet device and the performance of the second intranet device and according to a preset selection policy, the first intranet device from the first intranet device and the second intranet device to install the first software package, and performs step 230.

Optionally, the preset selection policy includes selecting an intranet device with better performance.

It is assumed that the first intranet device is the intranet device 201 in FIG. 1, and a type of the intranet device 201 is the model H-TG01 personal computer. It is assumed that the second intranet device is the intranet device 202 in FIG. 1, and a type of the intranet device 202 is a model D-VOSTRO personal computer. In this case, after identifying the types of the intranet device 201 and the intranet device 202, the gateway device 300 separately performs the method shown in FIG. 6 for the intranet device 201 and the intranet device 202, and determines that the intranet device 201 is used to install the Firewall.exe, and the intranet device 202 is also used to install the Firewall.exe. Performance of the intranet device 201 is better than that of the intranet device 202. Therefore, the gateway device 300 selects the intranet device 201 from the intranet device 201 and the intranet device 202, and the gateway device 300 sends an indication message to the intranet device 201. The indication message includes the software package Firewall.exe, and is used to indicate the intranet device 201 to install the software package Firewall.exe and perform a corresponding firewall function.

Optionally, the gateway device such as the gateway device 300 in FIG. 1 serves as an entity for controlling each intranet device to perform an additional function, and performs the network service processing method shown in FIG. 2, FIG. 6, or FIG. 7. A plurality of software packages used to execute various additional functions may be stored in a centralized manner or in a distributed manner. Centralized storage means that the plurality of software packages used to execute various additional functions are stored in a memory of the gateway device. Distributed storage means that all or some of the plurality of software packages used to execute various additional functions are stored in other network devices accessible by the gateway device. Optionally, these network devices configured to store all or some of the software packages may be deployed in the intranet 200, or in the extranet 100. A solution of the "cloud server" shown in FIG. 1 is used only as an example herein to describe distributed storage. The embodiments of this application provide three implementations of distributed storage.

Distributed Storage Solution 1

Each software package is stored on the cloud server shown by the server 101 in FIG. 1, instead of being stored in the gateway device 300. The gateway device 300 does not need to store a correspondence between the software package and an installation performance requirement, but stores a correspondence between an identifier of the software package and the installation performance requirement. In this case, an implementation process of step 620 in FIG. 6 is shown in FIG. 8.

Figure 8:
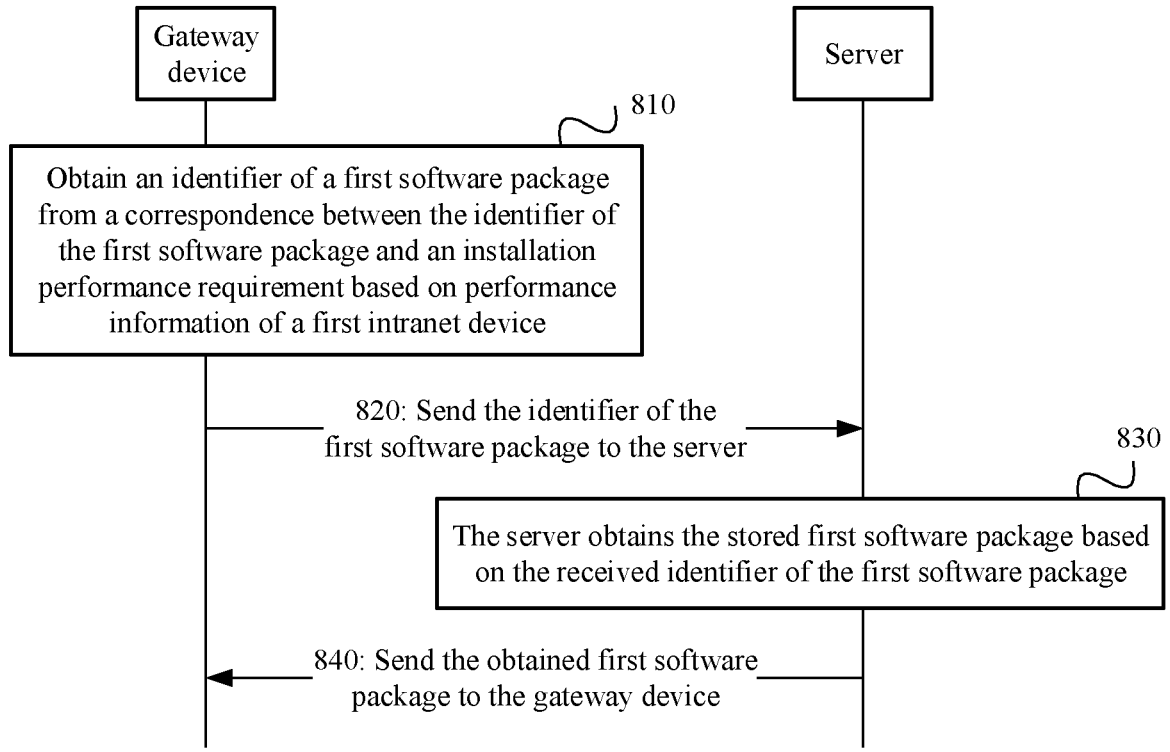
FIG. 8 is a flowchart in which a gateway device obtains a first software package based on performance of a first intranet device in a distributed storage solution 1 according to an embodiment of this application.

FIG. 8 describes a procedure in which the gateway device obtains the first software package based on the performance of the first intranet device.

The gateway device performs step 610 in FIG. 6. After determining the performance of the first intranet device based on the type of the first intranet device, the gateway device performs step 810 to step 840 in FIG. 8 in collaboration with the server to replace step 620 in FIG. 6.

Step 810: The gateway device obtains an identifier of the first software package from a correspondence between the identifier of the software package and an installation performance requirement based on the performance of the first intranet device. The performance of the first intranet device meets an installation performance requirement corresponding to the identifier of the first software package.

Step 820: The gateway device sends the identifier of the first software package to the server.

Step 830: The server obtains the stored first software package based on the received identifier of the first software package.

Step 840: The server sends the obtained first software package to the gateway device. The gateway device receives the first software package correspondingly returned by the server.

For example, it is assumed that the first intranet device is the intranet device 201, and the type of the intranet device 201 is the model H-TG01 personal computer. The gateway device 300 locally stores correspondences between identifiers of software packages and installation performance requirements, as shown in Table 4.

TABLE 4

| Record No. | Software package name (Software package identifier) | Installation performance requirements |
| --- | --- | --- |
| 1 | networkstorage | CPU: 128 MHz<br>Memory: 32 M<br>Hard disk capacity: 512 M |
| 2 | Firewall | CPU: 1 GHz<br>Memory: 512 M<br>Hard disk capacity: 512 M |
| 3 | Websandbox | CPU: 1 GHz<br>Memory: 1 G<br>Hard disk capacity: 256 G |

The gateway device 300 determines that the performance of the first intranet device meets an installation performance requirement of the software package named Firewall. The gateway device 300 sends an identifier "Firewall" of the first software package to the server 101. After receiving the software package Firewall.exe returned by the server 101, the gateway device 300 sends the first indication message and the software package Firewall.exe to the intranet device 201.

The distributed storage solution provided in this embodiment of this application can reduce a storage resource of the gateway device 300.

Distributed Storage Solution 2

Each software package is stored on the cloud server shown by the server 101 in FIG. 1, instead of being stored in the gateway device 300. The gateway device 300 does not need to store a correspondence between the software package and an installation performance requirement, or a correspondence between an identifier of the software package and the installation performance requirement; but only needs to store the correspondences between the types of the intranet devices and the performance shown in Table 2. The server 101 stores the software packages, and further needs to store the correspondences between the software packages and the installation performance requirements shown in Table 3. In this case, an implementation process of step 620 in FIG. 6 is shown in FIG. 9.

Figure 9:
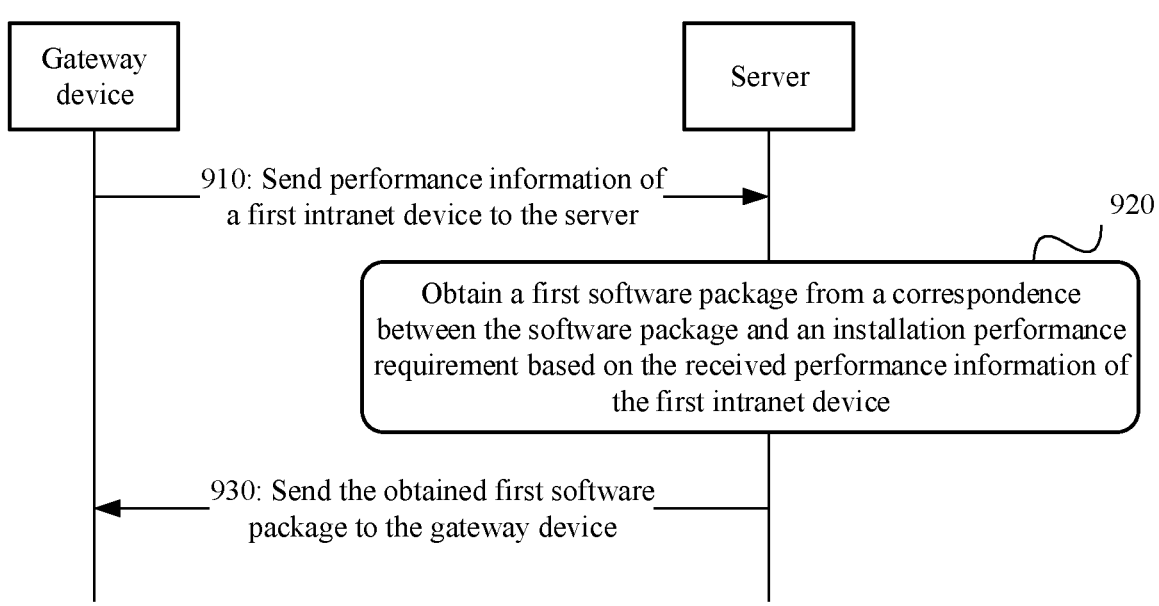
FIG. 9 is a flowchart in which a gateway device obtains a first software package based on performance of a first intranet device in a distributed storage solution 2 according to an embodiment of this application.

FIG. 9 describes a procedure in which the gateway device obtains the first software package based on the performance of the first intranet device.

The gateway device performs step 610 in FIG. 6. After determining the performance of the first intranet device based on the type of the first intranet device, the gateway device performs step 910 to step 930 in collaboration with the server to replace step 620 in FIG. 6.

Step 910: The gateway device sends the performance of the first intranet device to the server.

Step 920: The server obtains the first software package from a correspondence between the software package and an installation performance requirement based on the received performance of the first intranet device. The performance of the first intranet device meets an installation performance requirement corresponding to the identifier of the first software package.

For example, the server stores the correspondences between the software packages and the installation performance requirements shown in Table 3. After receiving the performance of the first intranet device sent by the gateway device, the server compares the performance of the first intranet device with the installation performance requirement corresponding to each software package. If main performance of the first intranet device is higher than the installation performance requirement of the first software package, the server determines that the performance of the first intranet device meets the installation performance requirement of the first software package.

Alternatively, the server does not store the correspondences between the software packages and the installation performance requirements shown in Table 3, but stores the correspondences between the identifiers of the software packages and the installation performance requirements shown in Table 4. After receiving the performance of the first intranet device, the server compares the performance of the first intranet device with the installation performance requirements corresponding to the identifiers of the software packages. If the main performance of the first intranet device is higher than the installation performance requirement corresponding to the identifier of the first software package, the server determines that the performance of the first intranet device meets the installation performance requirement of the first software package. Then, the server finds the corresponding first software package based on the identifier of the first software package.

Step 930: The server sends the first software package to the gateway device. Correspondingly, the gateway device receives the first software package correspondingly returned by the server, and then sends the first software package and the first indication message to the first intranet device.

For example, it is assumed that the first intranet device is the intranet device 201, and the type of the intranet device 201 is the model H-TG01 personal computer. The gateway device 300 determines, according to Table 2, that performance of the intranet device 201 is "CPU: 2 GHz; memory: 512 MB; hard disk capacity: 256 GB". The gateway device 300 sends the performance "CPU: 2 GHz; memory: 512 MB; hard disk capacity: 256 GB" of the intranet device 201 to the server 101. The server 101 compares the received performance "CPU: 2 GHz; memory: 512 MB; hard disk capacity: 256 GB" with each entry in the stored correspondences between the software packages and the installation performance requirements shown in Table 3, or the correspondences between the identifiers of the software packages and the installation performance requirements shown in Table 4, to ensure that the performance of the intranet device 201 meets an installation performance requirement of the software package Firewall.exe. The server 101 sends the software package Firewall.exe to the gateway device 300.

The distributed storage solution provided in this embodiment of this application can further reduce a storage resource of the gateway device and can also reduce a processing resource of the gateway device because the step of obtaining the first software package based on the performance is performed by the server.

Distributed Storage Solution 3

Each software package is stored on the cloud server shown by the server 101 in FIG. 1, instead of being stored in the gateway device 300. The gateway device 300 does not need to store a correspondence between the software package and an installation performance requirement, a correspondence between an identifier of the software package and the installation performance requirement, or the correspondences between the types of the intranet devices and the performance shown in Table 2. The server 101 stores each software package, and needs to store the correspondences between the software packages and the installation performance requirements shown in Table 3, and further needs to store the correspondences between the types of the intranet devices and the performance shown in Table 2. In this case, an implementation process of step 220 in FIG. 2 is shown in FIG. 10.

Figure 10:
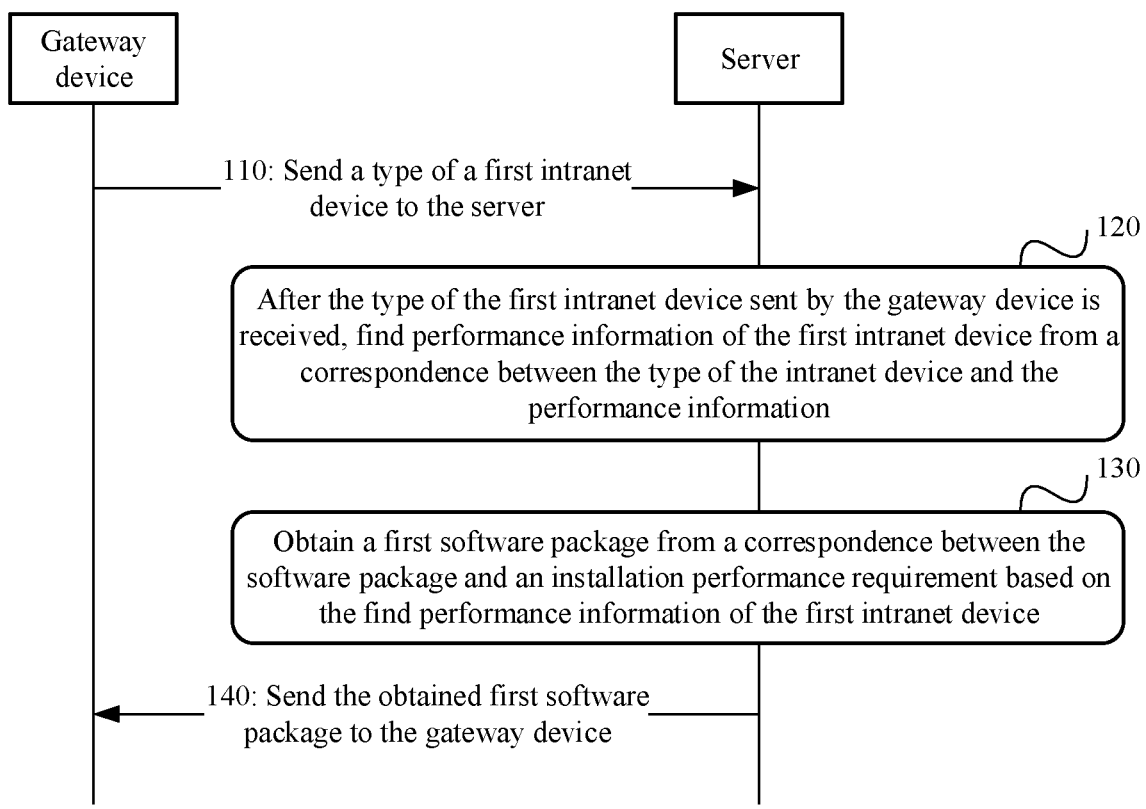
FIG. 10 is a flowchart in which a gateway device obtains a first software package based on performance of a first intranet device in a distributed storage solution 3 according to an embodiment of this application.

FIG. 10 describes a procedure in which the gateway device obtains the first software package based on the performance of the first intranet device.

After performing step 210 of identifying the type of the first intranet device in FIG. 2 or FIG. 6, the gateway device performs step 110 to step 130 in collaboration with the server to replace step 220 in FIG. 2, or replace steps 610 and 620 in FIG. 6.

Step 110: The gateway device sends the type of the first intranet device to the server.

Step 120: After receiving the type of the first intranet device sent by the gateway device, the server finds the performance of the first intranet device from the correspondences between the types of the intranet devices and the performance shown in Table 2.

Step 130: The server finds the first software package from a correspondence between the software package and an installation performance requirement based on the found performance of the first intranet device. The performance of the first intranet device meets an installation performance requirement corresponding to the identifier of the first software package.

For example, the server stores the correspondences between the software packages and the installation performance requirements shown in Table 3. After finding the performance of the first intranet device, the server compares the performance of the first intranet device with the installation performance requirement corresponding to each software package. If main performance of the first intranet device is higher than the installation performance requirement of the first software package, the server determines that the performance of the first intranet device meets the installation performance requirement of the first software package.

Alternatively, the server does not store the correspondences between the software packages and the installation performance requirements shown in Table 3, but stores the correspondences between the identifiers of the software packages and the installation performance requirements shown in Table 4. After finding the performance of the first intranet device, the server compares the performance of the first intranet device with the installation performance requirement corresponding to the identifier of each software package. If the main performance of the first intranet device is higher than the installation performance requirement corresponding to the identifier of the first software package, the server determines that the performance of the first intranet device meets the installation performance requirement of the first software package. Then, the server finds the corresponding first software package based on the identifier of the first software package.

Alternatively, the server does not store the correspondences between the software packages and the installation performance requirements shown in Table 3 or the correspondences between the identifiers of the software packages and the installation performance requirements shown in Table 4, but stores the correspondences between the types of the intranet devices and the software packages shown in Table 1. In this case, step 120 and step 130 may be directly simplified as follows: The server finds, based on the received type of the intranet device and the correspondences between the types of the intranet devices and the software packages, the software package corresponding to the type of the first intranet device. Step 220 is basically similar, except that the entities of executing the steps are different. Details are not described herein again.

Step 140: The server sends the first software package to the gateway device. Correspondingly, the gateway device receives the first software package correspondingly returned by the server, and then sends the first software package and the first indication message to the first intranet device.

An execution process of step 130 is similar to that of step 920 in FIG. 9, and an execution process of step 140 is similar to that of step 930 in FIG. 9. Details are not described herein again.

For example, it is assumed that the first intranet device is the intranet device 201, and the type of the intranet device 201 is the model H-TG01 personal computer. The gateway device 300 sends a type "personal computer: H-TG01" of the intranet device 201 to the server 101. After receiving the type "personal computer: H-TG01" of the intranet device 201, the server 101 finds, from the correspondences between the types of the intranet devices and the performance shown in Table 2, that performance corresponding to the type "personal computer: H-TG01" is "CPU: 2 GHz; memory: 512 MB; hard disk capacity: 256 GB". The server 101 further compares the performance "CPU: 2 GHz; memory: 512 MB; hard disk capacity: 256 GB" with each entry in the stored correspondences between the software packages and the installation performance requirements shown in Table 3, or the correspondences between the identifiers of the software packages and the installation performance requirements shown in Table 4, to determine that the performance "CPU: 2 GHz; memory: 512 MB; hard disk capacity: 256 GB" meets an installation performance requirement of the software package Firewall.exe. The server 101 sends the software package Firewall.exe to the gateway device 300.

The distributed storage solution provided in this embodiment of this application can further reduce a storage resource of the gateway device and can also reduce a processing resource of the gateway device because the step of querying the installation performance requirement based on the type of the first intranet device and the step of obtaining the first software package based on the performance are both performed by the server.

Optionally, according to the network service processing method described in FIG. 2 and FIG. 6 to FIG. 10, after the gateway device sends the first indication message and the first software package to the first intranet device, to help subsequently send a target data flow and/or description information used to describe the target data flow to the first intranet device that implements the first additional function, the gateway device further needs to record a correspondence between an identifier of the first intranet device and the first additional function. The target data flow is a data flow on which the first additional function is to be performed. A purpose that the gateway device records the correspondence between the identifier of the first intranet device and the first additional function is to correctly forward the target data flow subsequently, so as to correctly execute the first additional function. For example, the gateway device subsequently sends, based on the correspondence between the identifier of the first intranet device and the first additional function, the target data flow and/or the description information used to describe the target data flow to the first intranet device that implements the first additional function, and receives a processing result corresponding to the first intranet device. Optionally, for some additional functions, the gateway device performs, based on a received processing result, an action corresponding to the processing result on target data flow in to-be-forwarded traffic, where the action includes forwarding, alarming, or blocking. An implementation is shown in FIG. 11 and FIG. 12.

Figure 11:
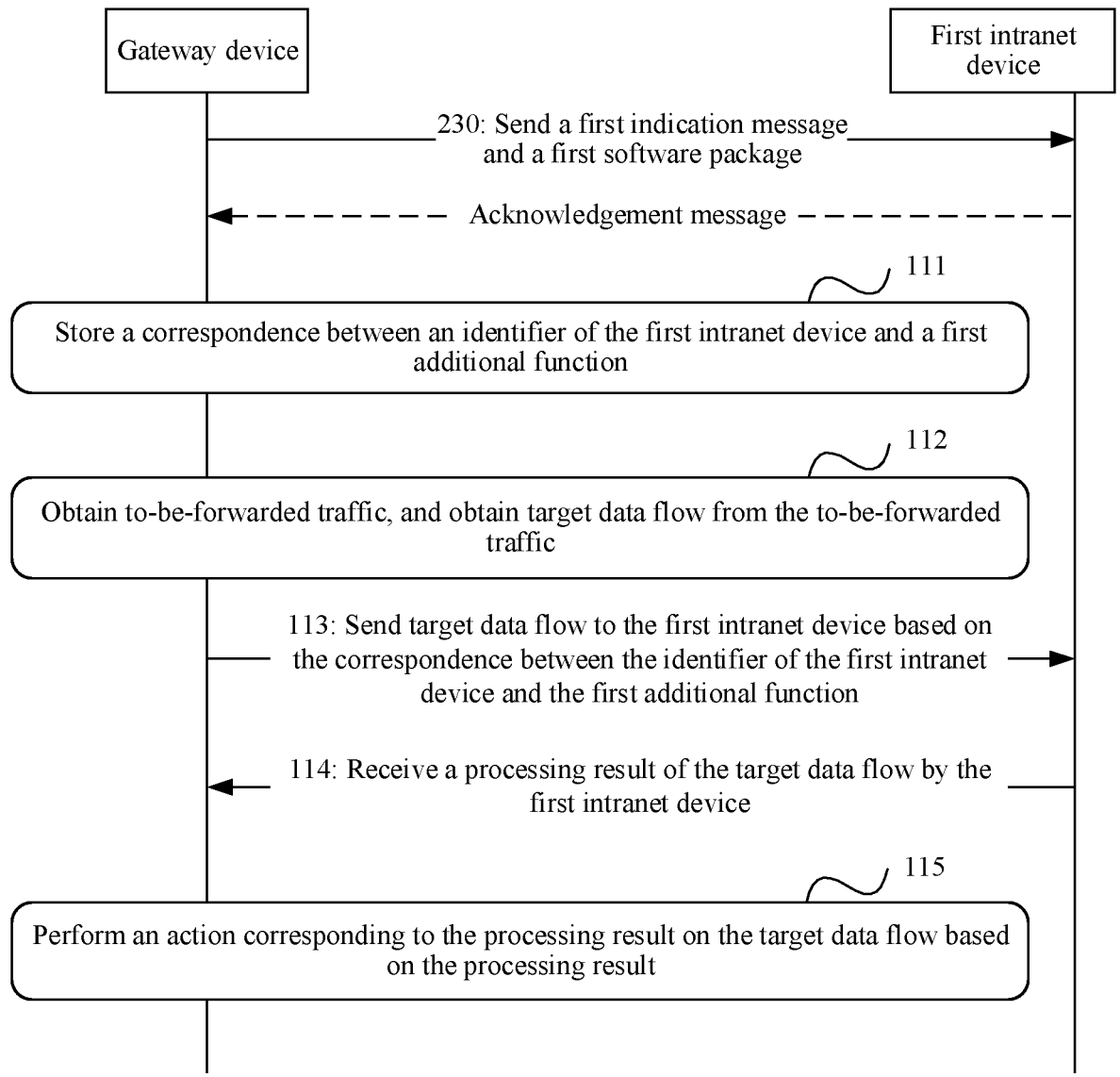
FIG. 11 is a flowchart of another network service processing method according to an embodiment of this application.
Figure 12:
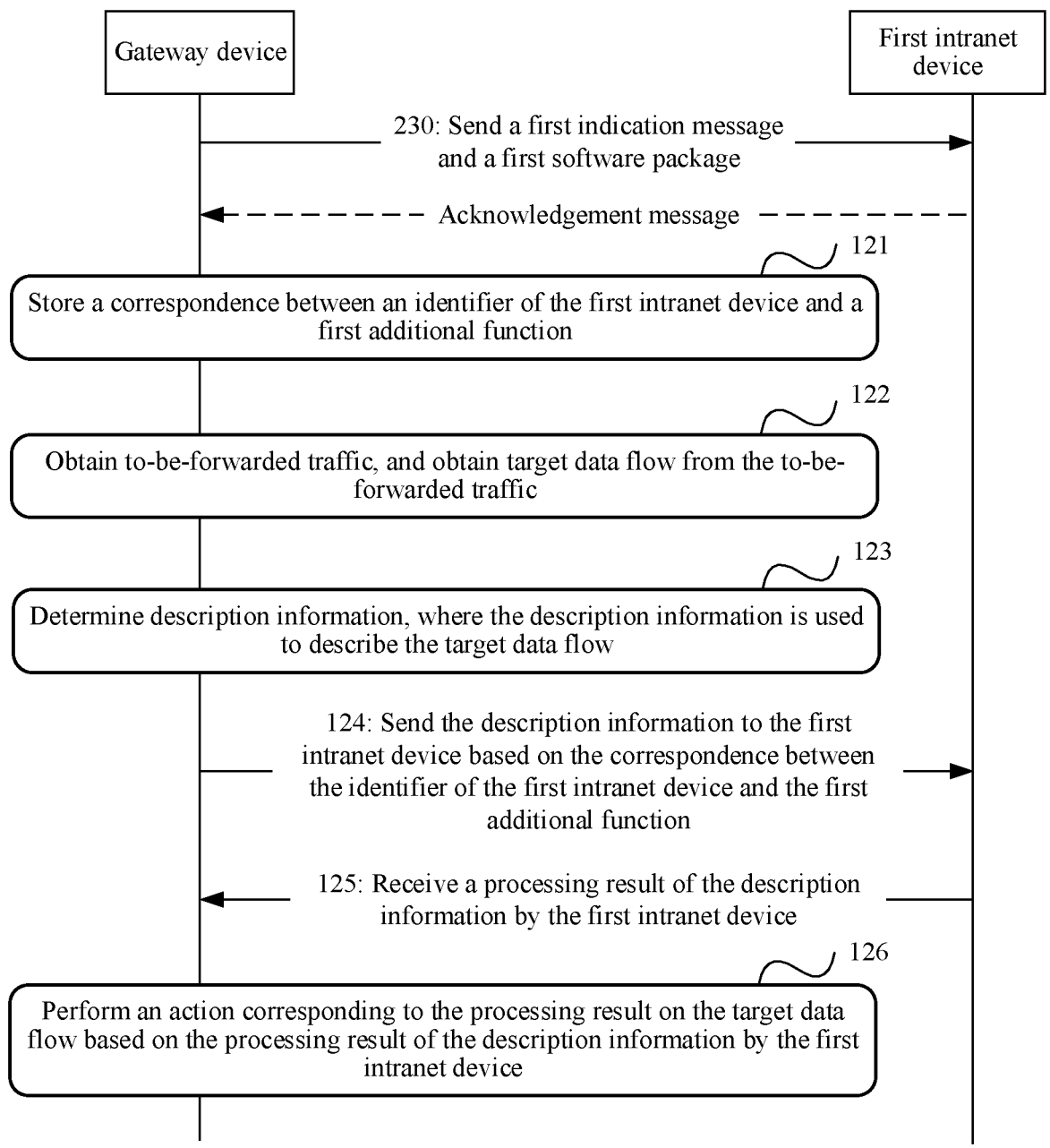
FIG. 12 is a flowchart of another network service processing method according to an embodiment of this application.

According to the network service processing method provided in the foregoing embodiments of this application, an embodiment of this application further provides a network service processing method, as shown in FIG. 11. FIG. 11 is a flowchart of a network service processing method according to an embodiment of this application. After a gateway device such as the gateway device 300 in FIG. 1 performs steps of sending a first indication message and a first software package to a first intranet device in the network service processing methods described in FIG. 2 and FIG. 6 to FIG. 10, the gateway device further performs steps shown in FIG. 11.

Step 111: The gateway device stores a correspondence between an identifier of the first intranet device and a first additional function.

Optionally, to ensure an implementation effect of the first additional function, after sending the first indication message and the first software package to the first intranet device, the gateway device waits to receive an acknowledgment message returned by the first intranet device after the first software package is installed. After the gateway device receives the acknowledgment message from the first intranet device, the gateway device stores the correspondence between the identifier of the first intranet device and the first additional function.

Step 112: The gateway device obtains to-be-forwarded traffic, and obtains a target data flow from the to-be-forwarded traffic, where the target data flow is a data flow on which the first additional function is to be performed.

Which data flows are target data flows are related to additional functions. For example, if the first additional function is a data flow security detection function, the target data flow is a to-be-detected data flow that meets a preset policy. The preset policy is set in advance based on a network scenario. The target data flow may be all bidirectional traffic, or may be unidirectional traffic sent from an extranet to an intranet.

For example, if the first additional function is a network buffer function, the target data flow is a data flow that carries to-be-buffered content. A type of the to-be-buffered content is preset. For example, the to-be-buffered content is multimedia content.

For example, if the first additional function is a security sandbox function, the target data flow is a data flow that carries to-be-detected file content. A format type of a to-be-detected file is preset, for example, a portable document format (PDF) file, an executable (exe) file, or a portable executable (PE) file. The gateway device may parse some packets in the to-be-forwarded data flow, for example, a small quantity of packets in an initial phase of session establishment, to determine whether a data flow to which these packets belong is a target data flow. For example, protocol parsing is performed on the small quantity of packets in the initial phase of session establishment to obtain file header data carried in the packets, and content type carried in a session is obtained from the file header data.

Step 113: The gateway device sends the target data flow to the first intranet device based on the correspondence between the identifier of the first intranet device and the first additional function.

Step 114: The gateway device receives a processing result of the target data flow by the first intranet device.

Optionally, an example in which the first additional function is the network buffer function is used. The first intranet device is the intranet device 201 in FIG. 1, and the gateway device is the gateway device 300 in FIG. 1. The gateway device 300 sends the first indication message and a software package networkstorage.exe to the intranet device 201. After completing installing the software package networkstorage.exe based on the first indication message, the intranet device 201 performs the network buffer function. The gateway device 300 records a correspondence between the intranet device 201 and the network buffer function. The preset policy configured on the gateway device 300 is to buffer a video file whose size exceeds 50 M. In other words, the target data flow is a data flow that carries the video file whose size exceeds 50 M. After subsequently receiving, through a network interface, the data flow that carries the video file whose size exceeds 50 M, the gateway device 300 performs an original forwarding procedure and sends the data flow to the intranet device 201. The gateway device 300 receives a buffer result of the intranet device 201 for the data flow. For example, the buffer result indicates that the video file is successfully buffered or the buffer result indicates that the video file fails to be buffered.

Optionally, for some additional functions, after step 114, the gateway device further performs step 115.

Step 115: The gateway device performs an action corresponding to the processing result on the target data flow based on the processing result, where the action includes forwarding, alarming, or blocking.

Optionally, an example in which the first additional function is the data flow security detection function is used. The first intranet device is the intranet device 201 in FIG. 1, and the gateway device is the gateway device 300 in FIG. 1. The gateway device 300 sends the first indication message and a software package Firewall.exe to the intranet device 201. After completing installing the software package Firewall.exe based on the first indication message, the intranet device 201 performs the data flow security detection function such as a firewall. The gateway device 300 records a correspondence between the intranet device 201 and the data flow security detection function. The preset policy configured on the gateway device 300 is to perform security detection on the unidirectional traffic sent from the extranet to the intranet. In other words, the to-be-detected target data flow is the unidirectional traffic sent from the extranet to the intranet. After subsequently receiving, through a network interface, a data flow sent from the extranet 100 to the intranet 200, the gateway device 300 sends the data flow to the intranet device 201. After the gateway device 300 receives a security detection result of the intranet device 201 on the target data flow, if the security detection result indicates that the target data flow does not include data that violates a firewall rule, the gateway device 300 forwards the target data flow to the intranet 200 through the network interface. If the security detection result indicates that the target data flow includes the data that violates the firewall rule, the gateway device 300 blocks the target data flow, and forbids to forward the target data flow to the intranet 200 through the network interface.

According to the processing method shown in FIG. 11, in some application scenarios, to reduce an amount of data sent by the gateway device to the intranet device that performs the additional function, the gateway device first parses, analyzes, extracts, or collects statistics on the target data flow to obtain description information used to describe the target data flow. The description information is also referred to as metadata. The metadata is data that describes data (data about data), is mainly information that describes a property of the data, and is used to support functions such as storage location indication, historical data description, resource searching, and file recording. Optionally, there are a plurality of manners and formats of generating the description information, including formats supported by a standard organization and an existing mainstream vendor, or a format customized by an administrator, for example, an IP flow information export (IPFIX) protocol format, a NetFlow format, and an sFlow format that are defined by the Internet Engineering Task Force (IETF).

The gateway device sends the description information instead of the target data flow to the intranet device that performs the additional function, to reduce the amount of the data transmitted between the gateway device and the intranet device. An implementation process is shown in FIG. 12.

FIG. 12 shows a network service processing method according to an embodiment of this application. After a gateway device such as the gateway device 300 in FIG. 1 performs steps of sending a first indication message and a first software package to a first intranet device in the network service processing methods described in FIG. 2 and FIG. 6 to FIG. 10, the gateway device further performs steps shown in FIG. 12.

Step 121: The gateway device stores a correspondence between an identifier of the first intranet device and a first additional function.

Step 122: The gateway device obtains to-be-forwarded traffic, and obtains a target data flow from the to-be-forwarded traffic, where the target data flow is a data flow on which the first additional function is to be performed.

Step 121 and step 122 in FIG. 12 are respectively similar to step 111 and step 112 in FIG. 11, and are not repeatedly described herein.

Step 123: The gateway device determines description information, where the description information is used to describe the target data flow.

Step 124: The gateway device sends the description information to the first intranet device based on the correspondence between the identifier of the first intranet device and the first additional function.

Step 125: The gateway device receives a processing result of the description information by the first intranet device.

Step 126: The gateway device performs an action corresponding to the processing result on the target data flow based on the processing result of the description information by the first intranet device, where the action includes forwarding, alarming, or blocking.

Optionally, an example in which the first additional function is the data flow security detection function is used. The first intranet device is the intranet device 201 in FIG. 1, and the gateway device is the gateway device 300 in FIG. 1. The gateway device 300 sends the first indication message and a software package Firewall.exe to the intranet device 201. After completing installing the software package Firewall.exe based on the first indication message, the intranet device 201 performs the data flow security detection function such as a firewall. The gateway device 300 records a correspondence between the intranet device 201 and the data flow security detection function. The preset policy configured on the gateway device 300 is to perform security detection on the unidirectional traffic sent from the extranet to the intranet. In other words, the target data flow is the unidirectional traffic sent from the extranet to the intranet. After subsequently receiving, through a network interface, a data flow (namely, the target data flow) sent from the extranet 100 to the intranet 200, the gateway device 300 extracts the description information of the target data flow. The description information includes 5-tuple information including a source address, a source port number, a destination address, a destination port number, and a protocol type. Optionally, the description information further includes content of some specified fields in a packet header, and the like. The gateway device 300 sends the description information to the intranet device 201. After the gateway device 300 receives a security detection result of the intranet device 201 on the description information, if the security detection result indicates that the description information does not include data that violates a firewall rule, the gateway device 300 forwards the target data flow to the intranet 200 through the network interface. If the security detection result indicates that the description information includes the data that violates the firewall rule, the gateway device 300 blocks the target data flow, and forbids to forward the target data flow to the intranet 200 through the network interface.

Figure 13:
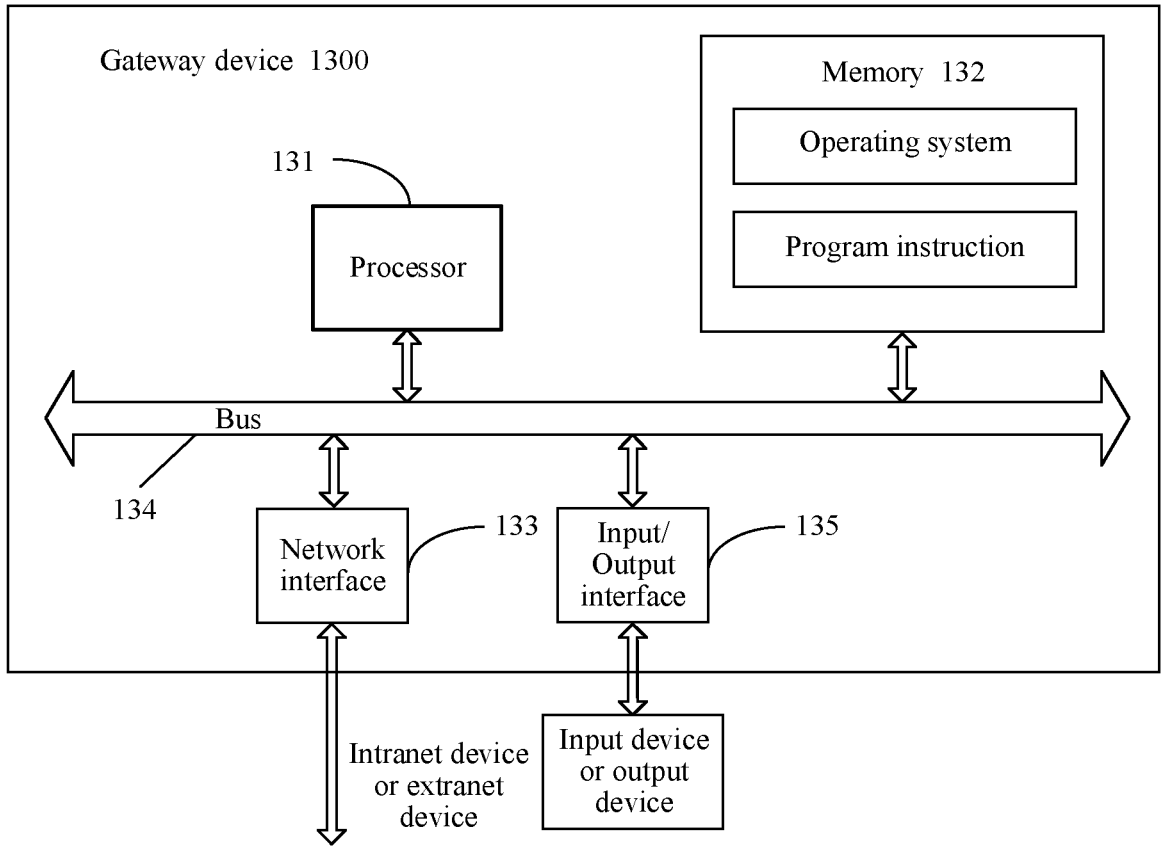
FIG. 13 is a diagram of a gateway device according to an embodiment of this application.

Correspondingly, an embodiment of this application provides a gateway device, configured to perform the network service processing methods provided in the foregoing embodiments. FIG. 13 is a diagram of a gateway device 1300 according to an embodiment of this application. Optionally, the gateway device 1300 shown in FIG. 13 is the gateway device 300 in the application scenario shown in FIG. 1, or the gateway device in the procedures shown in FIG. 2, and FIG. 6 to FIG. 12. The gateway device 1300 includes a processor 131, a memory 132, and a network interface 133.

The processor 131 may be one or more CPUs. The CPU may be a single-core CPU, or may be a multi-core CPU.

The memory 132 includes but is not limited to a random access memory (RAM), a read-only memory (ROM), an erasable programmable read-only memory (EPROM), a flash memory, an optical memory, or the like. The memory 132 stores code of an operating system.

The network interface 133 may be a wired interface, for example, a fiber distributed data interface (FDDI) or a Gigabit Ethernet (GE) interface. Alternatively, the network interface 133 may be a wireless interface. The network interface 133 is configured to: receive a data flow from an intranet and/or an extranet, communicate with an intranet device in the intranet and communicate with a server in the extranet according to an indication of the processor 131.

Optionally, the processor 131 implements the methods in the foregoing embodiments by reading instructions stored in the memory 132, or the processor 131 may implement the methods in the foregoing embodiments by executing instructions stored in the processor 131. When the processor 131 implements the methods in the foregoing embodiments by reading the instructions stored in the memory 132, the memory 132 stores the instructions for implementing the methods provided in the foregoing embodiments of this application.

After the processor 131 executes the instructions stored in the memory 132, the gateway device is enabled to perform the following operations: identifying a type of a first intranet device, where the first intranet device belongs to an intranet connected to the gateway device; obtaining a first software package based on the type of the first intranet device, where the first software package is used to implement a first additional function; and sending a first indication message and the first software package to the first intranet device through the network interface 133, where the first indication message is used to indicate the first intranet device to install the first software package and execute the first additional function.

The at least one processor 131 further performs the network service processing methods described in the foregoing method embodiments based on several correspondence tables stored in the memory 132 (for example, Table 1, Table 2, Table 3, and Table 4 in the foregoing embodiments). For more details of implementing the foregoing functions by the processor 131, refer to the descriptions in the foregoing method embodiments. Details are not described herein again.

Optionally, the gateway device further includes a bus 134. The processor 131 and the memory 132 are usually connected to each other through the bus 134, or may be connected to each other in another manner.

Optionally, the gateway device further includes an input/output interface 135. The input/output interface 135 is configured to: connect to an output device; output a prompt message to an administrator to notify the administrator that the first intranet device can execute the first additional function; and output an alarm based on a processing result of the intranet device under an appropriate condition. The output device includes but is not limited to a display, a printer, and the like.

The input/output interface 135 is further configured to connect to an input device, and receive an acknowledgment message returned by the administrator for the prompt message. The input device includes but is not limited to a keyboard, a touchscreen, a microphone, a Bluetooth module, and the like.

For other additional functions that may be implemented by the gateway device shown in FIG. 13 and a process of interaction with another network element device (for example, an intranet device or a server), refer to the descriptions of the gateway device in the method embodiments. Details are not described herein again.

The gateway device provided in this embodiment of this application is configured to perform the network service processing methods provided in the foregoing method embodiments. The gateway device does not need to perform an additional function, but serves as a management control entity that implements the additional function; and controls an appropriate intranet device to share a task of implementing the additional function. A main function of the gateway device is to: identify a type of the intranet device; send, to the intranet device based on the type of the intranet device, a software package used to implement the appropriate additional function; and indicate the intranet device to implement the additional function after successfully installing the software package.

Figure 14:
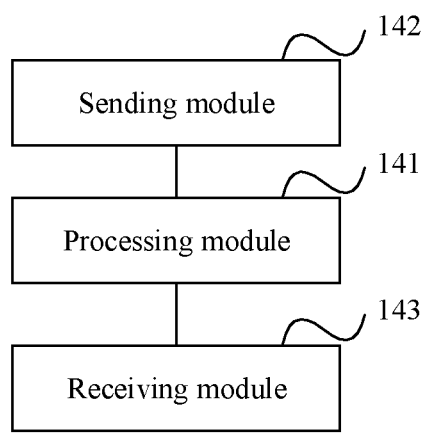
FIG. 14 is a diagram of a network service processing apparatus according to an embodiment of this application.

FIG. 14 is a diagram of a network service processing apparatus according to an embodiment of this application. The processing apparatus 14 includes a processing module 141 and a sending module 142. The processing apparatus 14 is coupled to and connected to the gateway device in the foregoing method embodiments. For example, the processing apparatus 14 is integrated into the gateway device, and is software or a hardware component in the gateway device. The processing apparatus shown in FIG. 14 is applied to the scenario shown in FIG. 1 in the method embodiments, to implement functions of the gateway device.

The processing module 141 is configured to: identify a type of a first intranet device, where the first intranet device belongs to an intranet connected to the gateway device; and obtain a first software package based on the identified type of the first intranet device, where the first software package is used to implement a first additional function.

The sending module 142 is configured to send a first indication message and the first software package to the first intranet device, where the first indication message is used to indicate the first intranet device to install the first software package and execute the first additional function.

Optionally, that the processing module 141 obtains the first software package based on the type of the first intranet device includes: determining performance of the first intranet device based on the type of the first intranet device, where the performance includes a software capability and a hardware capability, the software capability includes whether software package installation is supported, and the hardware capability includes a processor performance value and/or a storage space size; and obtaining the first software package based on the performance of the first intranet device, where the performance of the first intranet device meets an installation performance requirement of the first software package.

Optionally, before the sending module 142 sends the first indication message and the first software package to the first intranet device, the processing module 141 is further configured to identify a type of a second intranet device, where the second intranet device belongs to the intranet. The processing module 141 determines performance of the second intranet device based on the type of the second intranet device; and obtains a second software package, where the performance of the second intranet device meets an installation performance requirement of the second software package. If the first software package and the second software package are a same software package, the gateway device selects the first intranet device from the first intranet device and the second intranet device to install the first software package.

Optionally, the apparatus further includes a receiving module 143.

After the sending module 142 sends the first indication message and the first software package to the first intranet device, the processing module 141 stores a correspondence between an identifier of the first intranet device and the first additional function.

The processing module 141 obtains a target data flow from to-be-forwarded traffic received by the receiving module 143, where the target data flow is a data flow on which the first additional function is to be performed. The processing module 141 sends the target data flow to the first intranet device by using the sending module 142 based on the correspondence between the identifier of the first intranet device and the first additional function; and receives a processing result of the target data flow by the first intranet device by using the receiving module 143.

For additional functions that can be implemented by the processing module 141, the sending module 142, and the receiving module 143, and more details about implementing the foregoing functions, refer to the descriptions in the foregoing method embodiments. Details are not described herein again.

The apparatus embodiment shown in FIG. 14 is merely an example. For example, division into the modules is merely logical function division and may be other division in actual implementation. For example, a plurality of modules or components may be combined or integrated into another system, or some features may be ignored or not performed. Functional modules in the embodiments of this application may be integrated into one processing module, or each of the modules may exist alone physically, or two or more modules are integrated into one module. The foregoing modules in FIG. 14 may be implemented in a form of hardware, or may be implemented in a form of a software functional unit. For example, when software is used for implementation, the processing module 141, the sending module 142, and the receiving module 143 may be implemented by software functional modules generated after the processor 131 in FIG. 13 reads program code stored in the memory. The foregoing modules in FIG. 14 may alternatively be separately implemented by different hardware in the gateway device. For example, the sending module 142 and the receiving module 143 are implemented by the network interface 133 in FIG. 13; and the processing module 141 is completed by using some processing resources (for example, another core in a multi-core processor) in the processor 131 in FIG. 13, or by using a programmable device such as a field-programmable gate array (FPGA) or a coprocessor. It is clear that the foregoing functional modules may alternatively be implemented by combining software and hardware. For example, the sending module 142 and the receiving module 143 are implemented by the network interface 133, and the processing module 141 is implemented by a software functional module generated after a CPU reads the instructions stored in the memory.

For other additional functions that may be implemented by the apparatus in FIG. 14, a process of interaction with another network element device (for example, an intranet device or a server), technical effects that can be implemented by the apparatus, and more details of implementing the foregoing functions by the processing module 141, the sending module 142, and the receiving module 143, refer to the descriptions of the gateway device in the foregoing method embodiments. Details are not described herein again.

An embodiment of this application further provides a network service processing system. The processing system includes a gateway device and at least one intranet device. The gateway device is configured to connect an extranet and an intranet. The at least one intranet device belongs to the intranet. Optionally, when software packages are stored in a distributed manner, the processing system further includes a server, and the server is deployed in the intranet or the extranet. For more details of implementing respective functions by the gateway device, the intranet device, and the server in the processing system and more details of interaction processes between the gateway device, the intranet device, and the server, refer to the descriptions of the gateway device in the foregoing method embodiments. Details are not described herein again.

The embodiments in this specification are all described in a progressive manner, for same or similar parts in the embodiments, refer to these embodiments, and each embodiment focuses on a difference from other embodiments. Especially, a system embodiment is basically similar to a method embodiment, and therefore is described briefly. For related parts, refer to some descriptions in the method embodiment.

A person of ordinary skill in the art understands that when the various aspects or implementations of the various aspects of the embodiments of this application are implemented by using software, all or some of the foregoing aspects or the implementations of the various aspects may be implemented in a form of a computer program product. The computer program product refers to computer-readable instructions stored in a computer-readable medium. When the computer instructions are loaded and executed on a computer, the procedures or functions according to the embodiments of this application are all or partially generated.

The computer-readable medium may be a computer-readable signal medium or a computer-readable storage medium. The computer-readable storage medium includes but is not limited to an electronic, magnetic, optical, electromagnetic, infrared, or semiconductor system, device, or apparatus, or any appropriate combination thereof. For example, the computer-readable storage medium is a random access memory (RAM), a read-only memory (ROM), an erasable programmable read-only memory (EPROM), or a portable read-only memory (Compact Disc Read-Only Memory, CD-ROM).

It is clear that a person skilled in the art can make various modifications and variations to the disclosure without departing from the scope of the embodiments provided herein. The patent application is intended to cover these modifications and variations provided that they fall within the scope of protection defined by the following claims.

What is claimed is:

1. A network service processing method, comprising:
   identifying, by a gateway device, a first intranet device type of a first intranet device, the first intranet device belonging to an intranet connected to the gateway device;
   obtaining, by the gateway device, a first software package based on the first intranet device type, the first software package being used to implement a first additional function; and
   sending, by the gateway device, a first indication message and the first software package to the first intranet device, the first indication message indicating the first intranet device install the first software package and execute the first additional function.

2. The processing method according to claim 1, wherein the obtaining, by the gateway device, the first software package based on the first intranet device type comprises:
   determining, by the gateway device, a first intranet device performance of the first intranet device based on the first intranet device type, the first intranet device performance comprising a software capability and a hardware capability, the software capability comprising whether a software package installation is supported, and the hardware capability comprising a processor performance value and/or a storage space size; and
   obtaining, by the gateway device, the first software package based on the first intranet device performance, the first intranet device performance meeting an installation performance requirement of the first software package.

3. The processing method according to claim 2, wherein the obtaining, by the gateway device, the first software package based on the first intranet device performance comprises:
   finding, by the gateway device, the first software package from a correspondence between the software package and the installation performance requirement, the finding being based on the first intranet device performance.

4. The processing method according to claim 2, wherein the obtaining, by the gateway device, the first software package based on the first intranet device performance comprises:

finding, by the gateway device, a first software package identifier of the first software package from a correspondence between the first software package identifier and the installation performance requirement, the finding being based on the first intranet device performance; and sending, by the gateway device, the first software package identifier to a server, and receiving the first software package returned by the server based on the first software package identifier.

5. The processing method according to claim 2, wherein the obtaining, by the gateway device, the first software package based on the first intranet device performance comprises:

sending, by the gateway device, the first intranet device performance to a server; and receiving, by the gateway device, the first software package returned by the server based on the first intranet device performance.

6. The processing method according to claim 1, wherein the obtaining, by the gateway device, a first software package based on the first intranet device type comprises:

sending, by the gateway device, the first intranet device type to a server; and receiving, by the gateway device, the first software package returned by the server based on the first intranet device type.

7. The processing method according to claim 2, wherein before the sending, by the gateway device, the first indication message and the first software package to the first intranet device, the method further comprises:

identifying, by the gateway device, a second intranet device type of a second intranet device, the second intranet device belonging to the intranet;

determining, by the gateway device, a second intranet device performance of the second intranet device based on the second intranet device type;

finding, by the gateway device, a second software package from a correspondence between the software package and an installation performance requirement, the finding being based on the second intranet device performance, the second intranet device performance meeting the installation performance requirement of the second software package; and if the first software package and the second software package are a same software package, selecting, by the gateway device, the first intranet device from the first intranet device and the second intranet device to install the first software package.

8. The method according to claim 1, wherein after the sending, by the gateway device, the first indication message and the first software package to the first intranet device, the method further comprises:

storing, by the gateway device, a correspondence between a first intranet device identifier and the first additional function;

obtaining, by the gateway device, a target data flow on which the first additional function is to be performed;

sending, by the gateway device, the target data flow to the first intranet device based on the correspondence between the first intranet device identifier and the first additional function; and receiving a processing result of the target data flow by the first intranet device.

9. The method according to claim 8, wherein after the receiving the processing result of the target data flow by the first intranet device, the method further comprises:

performing, by the gateway device, an action corresponding to the processing result on the target data flow based on the processing result, wherein the action comprises forwarding, alarming, or blocking.

10. The method according to claim 8, wherein the first additional function is a data flow security detection function, and the target data flow is a to-be-detected data flow.

11. The method according to claim 8, wherein the first additional function is a security sandbox function, and the target data flow is a data flow that carries to-be-detected file content.

12. The method according to claim 1, wherein the identifying, by the gateway device, the first intranet device type comprises:

intercepting, by the gateway device, a feature packet sent by the first intranet device, the feature packet carrying a first feature field, and content of the first feature field indicating an operating system type or a preset website domain name of a sender;

querying, by the gateway device, a feature library for a first device type corresponding to the content of the first feature field, the feature library storing a correspondence between the content of the first feature field and the first device type; and determining, by the gateway device, that the first intranet device is of the first intranet device type.

13. The method according to claim 1, wherein the identifying, by the gateway device, the first intranet device type comprises:

obtaining, by the gateway device, a MAC address of the first intranet device;

querying, by the gateway device, a device information library for a first device type corresponding to the MAC address of the first intranet device, the device information library storing a correspondence between the MAC address of the first intranet device and the first device type; and determining, by the gateway device, the first intranet device is of the first intranet device type.

14. The method according to claim 1, wherein the identifying, by the gateway device, the first intranet device type comprises:

sending, by the gateway device, a probe packet to the first intranet device;

receiving, by the gateway device, a response packet that corresponds to the probe packet and the response packet is sent by the first intranet device;

obtaining, by the gateway device, a first identification fingerprint based on the response packet;

querying, by the gateway device, a fingerprint library for a device type corresponding to the first identification fingerprint, the fingerprint library storing a correspondence between the first identification fingerprint and the device type; and determining, by the gateway device, that the first intranet device is of the first intranet device type.

15. A gateway device, comprising:
a network interface;
a memory storing instructions; and
at least one processor in communication with the network interface and the memory, the at least one processor configured, upon execution of the instructions, to perform the following steps:
identify a first intranet device type of a first intranet device, the first intranet device belonging to an intranet connected to the gateway device;
obtain a first software package based on the first intranet device type, the first software package being used to implement a first additional function; and
send a first indication message and the first software package to the first intranet device through the network interface, the first indication message indicating the first intranet device install the first software package and execute the first additional function.

16. The gateway device according to claim 15, wherein the instructions when executed by the at least one processor further cause the gateway device to:
determine a first intranet device performance of the first intranet device based on the first intranet device type, the first intranet device performance comprising a software capability and a hardware capability, the software capability comprising whether a software package installation is supported, and the hardware capability comprising a processor performance value and/or a storage space size; and
obtain the first software package based on the first intranet device performance, the first intranet device performance meeting an installation performance requirement of the first software package.

17. The gateway device according to claim 15, wherein the instructions when executed by the at least one processor further cause the gateway device to:
before sending the first indication message and the first software package to the first intranet device through the network interface, identify a second intranet device type of a second intranet device, the second intranet device belonging to the intranet;
determine a second intranet device performance of the second intranet device based on the second intranet device type;
find a second software package from a correspondence between the software package and an installation performance requirement, the finding being based on the second intranet device performance, the second intranet device performance meeting the installation performance requirement of the second software package; and if the first software package and the second software package are a same software package, select the first intranet device from the first intranet device and the second intranet device to install the first software package.

18. The gateway device according claim 15, wherein the instructions when executed by the at least one processor further cause the gateway device to:
after sending the first indication message and the first software package to the first intranet device through the network interface, store a correspondence between a first intranet device identifier of the first intranet device and the first additional function;
obtain a target data flow on which the first additional function is to be performed;
send the target data flow to the first intranet device through the network interface based on the correspondence between the first intranet device identifier and the first additional function; and
receive, through the network interface, a processing result of the target data flow by the first intranet device.

19. The gateway device according to claim 18, wherein the instructions when executed by the at least one processor further cause the gateway device to:
perform an action corresponding to the processing result on the target data flow based on the processing result, wherein the action comprises forwarding, alarming, or blocking.

20. A network service processing system, comprising:
a gateway device; and
a first intranet device in communication with the gateway device, the first intranet device belonging to an intranet connected to the gateway device;
the gateway device is configured to:
identify a first intranet device type of a first intranet device, the first intranet device belonging to an intranet connected to the gateway device;
obtain a first software package based on the first intranet device type, the first software package being used to implement a first additional function; and
send a first indication message and the first software package to the first intranet device, the first indication message indicating the first intranet device install the first software package and execute the first additional function; and
the first intranet device is configured to:
receive a first indication message and a first software package sent by the gateway device; and
execute a first additional function after installing the first software package based on the first indication message.

* * * * *